US012753119B2

(12) United States Patent
Bichler et al.

(10) Patent No.: US 12,753,119 B2
(45) Date of Patent: Oct. 6, 2026

(54) UNCHARGED CLAY BLOCKING AGENT

(71) Applicant: BASF SE, Ludwigshafen am Rhein (DE)

(72) Inventors: Manfred Bichler, Trostberg (DE); Alexander Schoebel, Trostberg (DE); Alexander Ganss, Trostberg (DE)

(73) Assignee: BASF SE, Ludwigshafen am Rhein (DE)

( * ) Notice: Subject to any disclaimer, the term of this patent is extended or adjusted under 35 U.S.C. 154(b) by 942 days.

(21) Appl. No.: 17/801,807

(22) PCT Filed: Feb. 19, 2021

(86) PCT No.: PCT/EP2021/054102
§ 371 (c)(1),
(2) Date: Aug. 24, 2022

(87) PCT Pub. No.: WO2021/170494
PCT Pub. Date: Sep. 2, 2021

(65) Prior Publication Data

US 2023/0107433 A1 Apr. 6, 2023

(30) Foreign Application Priority Data

Feb. 27, 2020 (EP) .................................... 20159712

(51) Int. Cl.

| | |
|---|---|
| ***C04B 24/26*** | (2006.01) |
| ***C04B 24/24*** | (2006.01) |
| ***C04B 28/04*** | (2006.01) |
| ***C04B 28/08*** | (2006.01) |
| ***C04B 28/14*** | (2006.01) |
| ***C08F 216/14*** | (2006.01) |
| ***C08F 220/56*** | (2006.01) |
| *C04B 103/30* | (2006.01) |
| *C04B 111/00* | (2006.01) |
| *C04B 111/62* | (2006.01) |
| *C04B 111/70* | (2006.01) |
| *C04B 111/72* | (2006.01) |

(52) U.S. Cl.
CPC ........ *C04B 24/2658* (2013.01); *C04B 24/246* (2013.01); *C04B 24/2694* (2013.01); *C04B 28/04* (2013.01); *C04B 28/08* (2013.01); *C04B 28/14* (2013.01); *C08F 216/1433* (2020.02); *C08F 220/56* (2013.01); *C04B 2103/30* (2013.01); *C04B 2111/00637* (2013.01); *C04B 2111/62* (2013.01); *C04B 2111/70* (2013.01); *C04B 2111/72* (2013.01)

(58) Field of Classification Search
CPC .............. C04B 24/2658; C04B 24/246; C04B 24/2694; C04B 28/04; C04B 28/08; C04B 28/14; C08F 216/1433; C08F 220/56
See application file for complete search history.

(56) References Cited

U.S. PATENT DOCUMENTS

| | | | | |
|---|---|---|---|---|
| 5,158,996 | A | 10/1992 | Valenti | |
| 7,790,667 | B2 | 9/2010 | Boeckh et al. | |
| 2008/0200590 | A1* | 8/2008 | Schinabeck ......... | C08F 220/585 526/287 |
| 2008/0300344 | A1 | 12/2008 | Georges et al. | |
| 2011/0269875 | A1 | 11/2011 | Nicoleau et al. | |
| 2014/0066546 | A1* | 3/2014 | Langlotz ................ | C04B 28/02 524/456 |

FOREIGN PATENT DOCUMENTS

| | | | | |
|---|---|---|---|---|
| EP | 1984309 | A1 | 10/2008 | |
| EP | 2649106 | A1 | 10/2013 | |
| EP | 3153482 | A1 | 4/2017 | |
| WO | 2008/012438 | A2 | 1/2008 | |
| WO | WO-2010026155 | A1 * | 3/2010 | ............. C04B 28/02 |
| WO | 2012/076365 | A1 | 6/2012 | |

OTHER PUBLICATIONS

International Search Report and Written Opinion received for PCT Patent Application No. PCT/EP2021/054102, mailed on Apr. 22, 2021, 8 pages.
European Search Report for EP Patent Application No. 20159712.7, Issued on Aug. 21, 2020, 3 pages.
Guggenheim, et al., "Summary of recommendations of nomenclature committees relevant to clay mineralogy: report of the Association Internationale pour l'Etude des Argiles (AIPEA) Nomenclature Committee for 2006", Clays and Clay minerals, vol. 54, Issue 6, Dec. 1, 2006, pp. 761-772.

* cited by examiner

*Primary Examiner* — John E Uselding
(74) *Attorney, Agent, or Firm* — Faegre Drinker Biddle & Reath LLP

(57) ABSTRACT

The present invention relates to a construction material composition comprising at least one non-ionic copolymer and the use of said construction material composition. Further, the present invention relates to a non-ionic copolymer and the use thereof for modifying robustness against clay deviations.

9 Claims, No Drawings

UNCHARGED CLAY BLOCKING AGENT

CROSS-REFERENCE TO RELATED APPLICATIONS

This application is a national stage application (under 35 U.S.C. § 371) of PCT/EP2021/054102, filed Feb. 19, 2021, which claims benefit of European Application No. 20159712.7, filed Feb. 27, 2020, both of which are incorporated herein by reference in their entirety.

The present invention is directed to a construction material composition comprising at least one non-ionic copolymer and the use of said construction material composition. Further, the present invention is directed to a non-ionic copolymer and the use thereof for modifying robustness against clay deviations.

Construction material composition comprise an inorganic binder, such as cement or gypsum.

Inorganic binders usually comprise impurities such as clay. These clay impurities may result in the reduction of the flowability of the construction material composition comprising the inorganic binder, since the plasticizer tends to have high adsorptive affinity towards clay. Clays have a high surface and/or a high porosity. The plasticizer may not be sufficiently available for the construction material composition due to the high affinity of the clay to said plasticizer. Hence, this may lead to negative effects in view of workability of said construction martial composition. Further, the hardened construction material composition may be influenced negatively due to an insufficient workability.

EP1984309 and EP2649106 describe that this negative effect may be reduced via cationic clay blocking agents (also known as clay blocker). The clay blocking agent has a higher affinity to clay than to the superplasticizer. Hence, the amount of plasticizer that is available for dispersion of the inorganic binder is less reduced. The dose efficiency is however not sufficient. Further, the cationic clay blocking agents have chloride as counter ions, which are undesired in several construction material compositions.

Against this background, it was an object of the present invention to provide a construction material composition, which is free of chloride. In particular, it was an object of the present application to provide a construction material composition, which on the one hand ensures good processability (workability) and to provide an improved robustness with respect to clay contamination. Additionally, it was an object of the present invention, to provide an improved clay blocking agent.

It has surprisingly been found that these objects can be achieved by the construction material composition comprising A) at least one non-ionic copolymer comprising residues based on the following monomer components:
   i) monomer Component A, comprising an ethylenically unsaturated monomer comprising at least one alkyl amide moiety or at least one nitrogen-containing heterocyclic moiety, and
   ii) monomer Component B, comprising an ethylenically unsaturated monomer comprising at least one polyether moiety; and B) at least one inorganic binder based on calcium sulfate.

It has additionally been found that at least one of these objects can be achieved by the construction material composition comprising A) at least one non-ionic copolymer comprising residues based on the following monomer components:

i) monomer Component A, comprising an ethylenically unsaturated monomer comprising at least one alkyl amide moiety or at least one nitrogen-containing heterocyclic moiety, and
   ii) monomer Component B, comprising an ethylenically unsaturated monomer comprising at least one polyether moiety, wherein
   the at least one polyether moiety in monomer Component B comprises the structural unit (a)
   $*—U—(C(O))_k—X\text{-}(AlkO)_n—W$ (a) which is as defined in the claims; and B) at least one inorganic binder selected from a hydraulic binder or a latent hydraulic binder.

It has surprisingly been found that if the non-ionic copolymer as defined herein is used in construction material compositions, the robustness against clay deviations is modified. In this context, the robustness against clay deviations is to be understood in that the workability is improved in such a way that the flow of the construction material compositions is less reduced than using no non-ionic copolymer.

In a first aspect, the present invention therefore relates to a construction material composition comprising A) at least one non-ionic copolymer comprising residues based on the following monomer components:
   i) monomer Component A, comprising an ethylenically unsaturated monomer comprising at least one alkyl amide moiety or at least one nitrogen-containing heterocyclic moiety, and
   ii) monomer Component B, comprising an ethylenically unsaturated monomer comprising at least one polyether moiety; and B) at least one inorganic binder based on calcium sulfate.

In the following, preferred embodiments of the components of the construction material composition are described in further detail. It is to be understood that each preferred embodiment is relevant on its own as well as in combination with other preferred embodiments. In a preferred embodiment A1 of the first aspect, the at least one polyether moiety in monomer Component B comprises the structural unit (a)

$$*—U—(C(O))_k—X\text{-}(AlkO)_n—W \qquad (a)$$

wherein

* denotes the binding site to the polymer,
U is a chemical bond or a $C_1$-$C_8$-alkylene,
X is O, N, or $NR^1$,
k is O or 1,
n is an integer having a mean value of between 24 to 300, based on the whole non-ionic copolymer,
Alk is $C_2$-$C_4$-alkylene, wherein Alk may be same or different within the group of $(AlkO)_n$,
W is H, $C_1$-$C_6$-alkyl, aryl, or Y—F,
Y is a linear or branched $C_2$-$C_8$-alkylene, which may further be substituted with a phenyl,
F is a 5 to 10-membered nitrogen heterocycle, which is attached via a nitrogen to Y, wherein besides the nitrogen atom and carbon atoms 1, 2, or 3 additional heteroatoms selected from the group consisting of oxygen, nitrogen, and sulfur may be present as ring members and wherein the nitrogen ring members may be bond to a moiety $R^2$, and wherein 1 or 2 carbon ring members may be present as carbonyl,
$R^1$ is H, $C_1$-$C_4$-alkyl, or benzyl, and
$R^2$ is H, $C_1$-$C_4$-alkyl, or benzyl.

In a second aspect, the present invention relates to a construction material composition comprising A) at least one non-ionic copolymer comprising residues based on the following monomer components:

i) monomer Component A, comprising an ethylenically unsaturated monomer comprising at least one alkyl amide moiety or at least one nitrogen-containing heterocyclic moiety, and ii) monomer Component B, comprising an ethylenically unsaturated monomer comprising at least one polyether moiety, wherein the at least one polyether moiety in monomer Component B comprises the structural unit (a)

$$*\text{—U—(C(O))}_k\text{—X-(AlkO)}_n\text{—W} \quad (a)$$

wherein

* denotes the binding site to the polymer,

U is a chemical bond or a $C_2$-$C_8$-alkylene,

X is O, N, or $NR^1$, k is O or 1, n is an integer having a mean value of between 24 to 300, based on the whole non-ionic copolymer, Alk is $C_2$-$C_4$-alkylene, wherein Alk may be same or different within the group of $(AlkO)_n$, W is H, $C_1$-$C_6$-alkyl, aryl, or Y—F, Y is a linear or branched $C_2$-$C_8$-alkylene, which may further be substituted with a phenyl, F is a 5 to 10-membered nitrogen heterocycle, which is attached via a nitrogen to Y, wherein besides the nitrogen atom and carbon atoms 1, 2, or 3 additional heteroatoms selected from the group consisting of oxygen, nitrogen, and sulfur may be present as ring members and wherein the nitrogen ring members may be bond to a moiety $R^2$, and wherein 1 or 2 carbon ring members may be present as carbonyl, $R^1$ is H, $C_1$-$C_4$-alkyl, or benzyl, and $R^2$ is H, $C_1$-$C_4$-alkyl, or benzyl, with the proviso that k is 0 if U is a chemical bond; and B) at least one inorganic binder selected from a hydraulic binder or a latent hydraulic binder.

In one embodiment B1 of the first and second aspect, the monomer Component A is selected from the group consisting of N,N-dimethylacrylamide, N,N-dimethylmetacrylamide, N,N-diethylacrylamide, N,N-diethylmethacrylamide, 1-vinyl-2-pyrrolidinone, N-vinylcaprolactam, 4-acryloylmorpholine, N-methyl-N-vinylacetamide, 1-vinylimidazole, 4-vinylpyridine, and 1-vinyl-1,2,4-triazole, and is preferably N,N-dimethylacrylamide.

In one embodiment B2 of the first and second aspect, the non-ionic copolymer further comprises residues based on a monomer Component C having the formula (1)

(1)

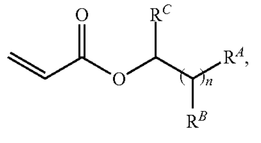

wherein $R^A$ is H, OH, ($C_1$-$C_3$-alkylene)-OH, or $C_1$-$C_3$-alky;

$R^B$ is H, OH, ($C_1$-$C_3$-alkylene)-OH, or $C_1$-$C_3$-alky;

$R^C$ is H, OH, ($C_1$-$C_3$-alkylene)-OH, or $C_1$-$C_3$-alky; and n is an integer from 0 to 10, and having preferably the formula (1a) or (1b)

(1a)

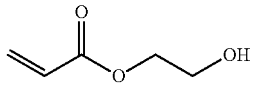

(1b)

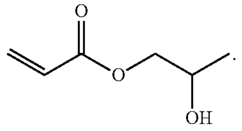

In one embodiment B3 of the first and second aspect, the construction material composition further comprises C) a plasticizer, preferably wherein the plasticizer is a water-soluble comb polymer which is present as a copolymer which contains, on the main chain, side chains having ether functions and acid functions or a composition containing polycondensates, wherein the polycondensates contains (I) at least one structural unit consisting of an aromatic or heteroaromatic moiety bearing a polyether side chain, preferably a poly alkylene glycol side chain, more preferably a poly ethylene glycol side chain and (II) at least one structural unit consisting of an aromatic or heteroaromatic moiety bearing at least one phosphoric acid ester group and/or its salt.

In a third aspect, the present invention relates to a non-ionic copolymer comprising residues based on the following monomer components:

i) monomer Component A selected from the group consisting of N,N-dimethylacrylamide, N,N-dimethylmetacrylamide, N,N-diethylacrylamide, N,N-diethylmethacrylamide, 4-acryloylmorpholine, N-methyl-N-vinylacetamide, 4-vinylpyridine, and 1-vinyl-1,2,4-triazole, preferably N,N-dimethylacrylamide;

ii) monomer Component B, comprising an ethylenically unsaturated monomer comprising at least one polyether moiety comprising the structural unit (a)

$$*\text{—U—(C(O))}_k\text{—X-(AlkO)}_n\text{—W} \quad (a)$$

wherein

* denotes the binding site to the polymer,

U is a chemical bond or a $C_2$-$C_8$-alkylene,

X is O, N, or $NR^1$, k is 0 or 1, n is an integer having a mean value of between 3 to 300, based on the whole non-ionic copolymer, Alk is $C_2$-$C_4$-alkylene, wherein Alk may be same or different within the group of $(AlkO)_n$, W is H, $C_1$-$C_6$-alkyl, aryl, or Y—F, Y is a linear or branched $C_2$-$C_8$-alkylene, which may further be substituted with a phenyl, F is a 5 to 10-membered nitrogen heterocycle, which is attached via a nitrogen to Y, wherein besides the nitrogen atom and carbon atoms 1, 2, or 3 additional heteroatoms selected from the group consisting of oxygen, nitrogen, and sulfur may be present as ring members and wherein the nitrogen ring members may be bond to a moiety $R^2$, and wherein 1 or 2 carbon ring members may be present as carbonyl, $R^1$ is H, $C_1$-$C_4$-alkyl, or benzyl, and $R^2$ is H, $C_1$-$C_4$-alkyl, or benzyl, with the proviso that k is 0 if U is a chemical bond; and iii) optionally monomer Component C, having the formula (1)

(1)

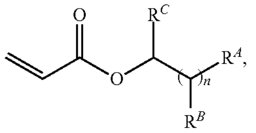

wherein $R^A$ is H, OH, ($C_1$-$C_3$-alkylene)-OH, or $C_1$-$C_3$-alky;

$R^B$ is H, OH, ($C_1$-$C_3$-alkylene)-OH, or $C_1$-$C_3$-alky;

$R^C$ is H, OH, ($C_1$-$C_3$-alkylene)-OH, or $C_1$-$C_3$-alky; and n is an integer from 0 to 10.

In one embodiment $C_1$ of the third aspect, (i) the monomer Component A is N,N-dimethylacrylamide;

(ii) the at least one polyether moiety in monomer Component B comprises the structural unit (a)

$$*\text{—U—(C(O))}_k\text{—X-(AlkO)}_n\text{—W} \qquad (a)$$

wherein

* denotes the binding site to the polymer,

U is a chemical bond or a $C_2$-alkylene,

X is O, k is 0 or 1, n is an integer having a mean value of between 3 to 300, based on the whole non-ionic copolymer, Alk is $C_2$-$C_4$-alkylene, wherein Alk may be same or different within the group of $(AlkO)_n$, W is H or methyl, with the proviso that k is 0 if U is a chemical bond; and iii) optionally monomer Component C, having the formula (1)

(1)

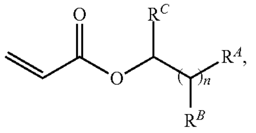

wherein $R^A$ is H, OH, ($C_1$-$C_3$-alkylene)-OH, or $C_1$-$C_3$-alky;

$R^B$ is H, OH, ($C_1$-$C_3$-alkylene)-OH, or $C_1$-$C_3$-alky;

$R^C$ is H, OH, ($C_1$-$C_3$-alkylene)-OH, or $C_1$-$C_3$-alky; and n is an integer from 1 to 5, and having preferably the formula (1a) or (1b)

(1a)

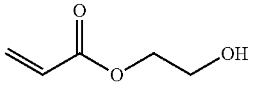

(1b)

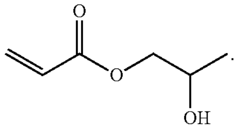

In a fourth aspect, the present invention relates to a construction material composition comprising at least one non-ionic copolymer according to the third aspect and at least one inorganic binder, preferably wherein the at least one inorganic binder is a hydraulic binder, a latent hydraulic binder, or an inorganic binder based on calcium sulfate.

In one embodiment D1 of the first, second, and fourth aspect, the construction material comprises at least one additional inorganic binder selected from the group consisting of hydraulic binder, latent hydraulic binder, inorganic binder based on calcium sulfate, and mixtures thereof.

In one embodiment D2 of the first, second, and fourth aspect, a hydraulic binder is comprised, which is preferably selected from the group consisting of Portland cement, calcium aluminate cement, sulfoaluminate cement, and mixtures thereof and/or wherein a latent hydraulic binder is comprised, which is preferably blast furnace slag.

In one embodiment D3 of the first, second, and fourth aspect, an inorganic binder based on calcium sulfate is comprised, which is in its anhydrous or hydrous forms, and which is preferably calcined gypsum.

In a fifth aspect, the present invention relates to the use of a non-ionic copolymer comprising residues based on the following monomer components:

i) monomer Component A, comprising an ethylenically unsaturated monomer comprising at least one alkyl amide moiety or at least one nitrogen-containing heterocyclic moiety;

ii) monomer Component B, comprising an ethylenically unsaturated monomer comprising at least one polyether moiety comprising the structural unit (a)

$$*\text{—U—(C(O))}_k\text{—X-(AlkO)}_n\text{—W} \qquad (a)$$

wherein

* denotes the binding site to the polymer,

U is a chemical bond or a $C_1$-$C_8$-alkylene,

X is O, N, or $NR^1$, k is 0 or 1, n is an integer having a mean value of between 3 to 300, based on the whole non-ionic copolymer, Alk is $C_2$-$C_4$-alkylene, wherein Alk may be same or different within the group of $(AlkO)_n$, W is H, $C_1$-$C_6$-alkyl, aryl, or Y—F, Y is a linear or branched $C_2$-$C_8$-alkylene, which may further be substituted with a phenyl, F is a 5 to 10-membered nitrogen heterocycle, which is attached via a nitrogen to Y, wherein besides the nitrogen atom and carbon atoms 1, 2, or 3 additional heteroatoms selected from the group consisting of oxygen, nitrogen, and sulfur may be present as ring members and wherein the nitrogen ring members may be bond to a moiety $R^2$, and wherein 1 or 2 carbon ring members may be present as carbonyl, $R^1$ is H, $C_1$-$C_4$-alkyl, or benzyl, and $R^2$ is H, $C_1$-$C_4$-alkyl, or benzyl; and iii) optionally monomer Component C, having the formula (1)

(1)

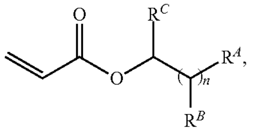

wherein $R^A$ is H, OH, ($C_1$-$C_3$-alkylene)-OH, or $C_1$-$C_3$-alky;

$R^B$ is H, OH, ($C_1$-$C_3$-alkylene)-OH, or $C_1$-$C_3$-alky;

$R^C$ is H, OH, ($C_1$-$C_3$-alkylene)-OH, or $C_1$-$C_3$-alky; and n is an integer from 0 to 10, in a construction material composition for modifying robustness against clay deviations, preferably without retarding the set time of the construction material composition.

In a sixth aspect, the present invention relates to the use of the non-ionic copolymer according to the third aspect in a construction material composition for modifying robustness against clay deviations, preferably without retarding the set time of the construction material composition or in a pretreatment of compositions comprising the non-ionic copolymer prior the addition of an inorganic binder.

In a seventh aspect, the present invention relates to the use of construction material composition according to the first, second, and fourth aspect, in dry mortar mixtures or in a concrete construction application, preferably in production of plate materials, self-leveling under or overlayments, screeds, repair mortars, grouts, plasters, tile adhesives.

DETAILED DESCRIPTION

Before describing in detail exemplary embodiments of the present invention, definitions important for understanding the present invention are given.

As used in this specification and in the appended claims, the singular forms of "a" and "an" also include the respective plurals unless the context clearly dictates otherwise. In the context of the present invention, the terms "about" and "approximately" denote an interval of accuracy that a person skilled in the art will understand to still ensure the technical effect of the feature in question. The term typically indicates a deviation from the indicated numerical value of ±20%, preferably ±15%, more preferably ±10%, and even more preferably ±5%. It is to be understood that the term "comprising" is not limiting. For the purposes of the present invention the term "consisting of" is considered to be a preferred embodiment of the term "comprising of". If hereinafter a group is defined to comprise at least a certain number of embodiments, this is meant to also encompass a group which preferably consists of these embodiments only. Furthermore, the terms "first", "second", "third" or "(a)", "(b)", "(c)", "(d)" etc. and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. In case the terms "first", "second", "third" or "(a)", "(b)", "(c)", "(d)", "i", "ii" etc. relate to steps of a method or use or assay there is no time or time interval coherence between the steps, i.e. the steps may be carried out simultaneously or there may be time intervals of seconds, minutes, hours, days, weeks, months or even years between such steps, unless otherwise indicated in the application as set forth herein above or below. It is to be understood that this invention is not limited to the particular methodology, protocols, reagents etc. described herein as these may vary. It is also to be understood that the terminology used herein is for the purpose of describing particular embodiments only, and is not intended to limit the scope of the present invention that will be limited only by the appended claims. Unless defined otherwise, all technical and scientific terms used herein have the same meanings as commonly understood by one of ordinary skill in the art.

The term "substituted", as used herein, means that a hydrogen atom bonded to a designated atom is replaced with a specified substituent, provided that the substitution results in a stable or chemically feasible compound. Unless otherwise indicated, a substituted atom may have one or more substituents and each substituent is independently selected.

When it is referred to certain atoms or moieties being substituted with "one or more" substituents, the term "one or more" is intended to cover at least one substituent, e.g. 1 to 10 substituents, preferably 1, 2, 3, 4, or 5 substituents, more preferably 1, 2, or 3 substituents, most preferably 1, or 2 substituents. When neither the term "unsubstituted" nor "substituted" is explicitly mentioned concerning a moiety, said moiety is to be considered as unsubstituted.

The organic moieties mentioned in the above definitions of the variables are—like the term halogen—collective terms for individual listings of the individual group members. The prefix $C_n$—$C_m$ indicates in each case the possible number of carbon atoms in the group.

The term "halogen" denotes in each case fluorine, bromine, chlorine, or iodine, in particular fluorine, chlorine, or bromine.

The term "halide" denotes in each case fluoride, bromide, chloride, or iodide, in particular fluoride, bromide, or chloride.

The term "alkyl" as used herein denotes in each case a straight-chain or branched alkyl group having usually from 1 to 10 carbon atoms, preferably from 1 to 8 carbon atoms. Examples of an alkyl group are methyl, ethyl, n-propyl, iso-propyl, n-butyl, 2-butyl, iso-butyl, tert-butyl, n-pentyl, 1-methylbutyl, 2-methylbutyl, 3-methylbutyl, 2,2-dimethylpropyl, 1-ethylpropyl, 1,1-dimethylpropyl, and 1,2-dimethylpropyl. Methyl, ethyl, n-propyl, iso-propyl, and iso-butyl, are particularly preferred.

As used herein, the term "alkylene" refers to a linking straight-chain or branched alkylene group having usually from 1 to 10 carbon atoms, e.g. 1, 2, 3, or 4 carbon atoms. The alkylene group bridges a certain group to the remainder of the molecule. Preferred alkylene groups include methylene ($CH_2$), ethylene ($CH_2CH_2$), propylene ($CH_2CH_2CH_2$) and the like. A skilled person understands that, if it is referred, e.g., to $CH_2$ that the carbon atom being tetravalent has two valences left for forming a bridge ($—CH_2—$). Similarly, when it is referred, e.g., to $CH_2CH_2$, each carbon atom has one valence left for forming a bridge ($—CH_2CH_2—$). Furthermore, when it is referred, e.g., to $CH_2CH_2CH_2$, each terminal carbon atom has one valence left for forming a bridge ($—CH_2CH_2CH_2—$).

The term "($C_n$—$C_m$-alkyl)" as used herein denotes in each case a linker moiety, wherein the thereto attached moieties are attached to the terminal carbons and wherein n is an integer selected from 1, 2, 3, 4, 5, 6, 7, or 8, preferable an integer selected from 1, 2, 3, or 4.

The term "C(═O)" as used therein denotes in each case a carbonyl moiety.

The term "aryl" or "aromatic carbocycle" preferably includes 6-membered aromatic carbocyclic rings based on carbon atoms as ring members. A preferred example is phenyl. Unless otherwise indicated, the term "aryl" further covers "aromatic carbobicycles".

The term "aromatic carbobicycles" includes in general 6 to 14-membered, preferably 7- to 12-membered or 8- to 10-membered, more preferably 9- or 10-membered bicyclic rings comprising 6 to 14, preferably 7 to 12 or 8 to 10, more preferably 9 or 10 carbon atoms. In aromatic carbobicycles the Hückel (4n+2) rule is fulfilled. Preferably, the term "aromatic" in connection with the carbobicyclic ring means that both rings of the bicyclic moiety are aromatic, so that, e.g., 8 π electrons are present in case of a 10-membered aromatic carbobicyclic ring. A preferred example is naphthalene.

The term "polyether moiety" as used herein denotes in each case a group of polymers in which the repeating unit contains a carbon-oxygen bond. Polyether moieties may exemplarily be derived from an aldehyde or an epoxide.

The term "heterocyclic" or "heterocyclyl" includes, unless otherwise indicated, in general a 3- to 10-membered, preferably a 4- to 8-membered or 5- to 7-membered, more preferably 5- or 6-membered, in particular 6-membered monocyclic ring. The heterocycle may be saturated, partially or fully unsaturated, or aromatic, wherein saturated means that only single bonds are present, and partially or fully unsaturated means that one or more double bonds may be present in suitable positions, while the Hückel rule for aromaticity is not fulfilled, whereas aromatic means that the Hückel (4n+2) rule is fulfilled. The heterocycle typically comprises one or more, e.g. 1, 2, 3, or 4, preferably 1, 2, or 3 heteroatoms selected from N, O and S as ring members, where S-atoms as ring members may be present as S, SO or $SO_2$. The remaining ring members are carbon atoms. In one embodiment, the heterocycle is an aromatic heterocycle, preferably a 5- or 6-membered aromatic heterocycle comprising one or more, e.g. 1, 2, 3, or 4, preferably 1, 2, or 3 heteroatoms selected from N, O, and S as ring members, where S-atoms as ring members may be present as S, SO or $SO_2$. Examples of aromatic heterocycles are provided below in connection with the definition of "hetaryl". "Hetaryls" or "heteroaryls" are covered by the term "heterocycles". The saturated or partially or fully unsaturated heterocycles usually comprise 1, 2, 3, 4 or 5, preferably 1, 2 or 3 heteroatoms selected from N, O and S as ring members, where S-atoms as ring members may be present as S, SO or $SO_2$. In a preferred embodiment, the heterocycle is a 4- to 6-membered saturated heterocycle comprising one or more, e.g. 1, 2, 3, or 4, preferably 1, 2, or 3 heteroatoms selected from N, O and S as ring members, where S-atoms as ring members may be present as S, SO or $SO_2$. The skilled person is aware that S, SO or $SO_2$ is to be understood as follows:

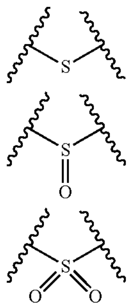

Further, a skilled person is aware that resonance structures of the oxidized forms may be possible.

Preferred saturated heterocycles include pyrrolidine, piperidine, or morpholine.

The term "hetaryl" or "heteroaryl" or "aromatic heterocycle" or "aromatic heterocyclic ring" or "heteroaromatic" includes monocyclic 5- or 6-membered aromatic heterocycles comprising as ring members 1, 2, 3 or 4 heteroatoms selected from N, O and S, where S-atoms as ring members may be present as S, SO or $SO_2$. Examples of 5- or 6-membered aromatic heterocycles include pyridyl (also referred to as pyridinyl), i.e. 2-, 3-, or 4-pyridyl, pyrimidinyl, i.e. 2-, 4- or 5-pyrimidinyl, pyrazinyl, pyridazinyl, i.e. 3- or 4-pyridazinyl, thienyl, i.e. 2- or 3-thienyl, furyl, i.e. 2- or 3-furyl, pyrrolyl, i.e. 2- or 3-pyrrolyl, oxazolyl, i.e. 2-, 3- or 5-oxazolyl, isoxazolyl, i.e. 3-, 4- or 5-isoxazolyl, thiazolyl, i.e. 2-, 3- or 5-thiazolyl, isothiazolyl, i.e. 3-, 4- or 5-isothiazolyl, pyrazolyl, i.e. 1-, 3-, 4- or 5-pyrazolyl, i.e. 1-, 2-, 4- or 5-imidazolyl, oxadiazolyl, e.g. 2- or 5-[1,3,4]oxadiazolyl, 4- or 5-(1,2,3-oxadiazol)yl, 3- or 5-(1,2,4-oxadiazol)yl, 2- or 5-(1,3,4-thiadiazol)yl, thiadiazolyl, e.g. 2- or 5-(1,3,4-thiadiazol)yl, 4- or 5-(1,2,3-thiadiazol)yl, 3- or 5-(1,2,4-thiadiazol)yl, triazolyl, e.g. 1H-, 2H- or 3H-1,2,3-triazol-4-yl, 2H-triazol-3-yl, 1H-, 2H-, or 4H-1,2,4-triazolyl and tetrazolyl, i.e. 1H- or 2H-tetrazolyl.

As used herein, the term "non-ionic copolymer" denotes in each case that the copolymer is uncharged at a pH range from 3 to 12, preferably from 5 to 9, more preferably from 6 to 8, and in particular from 6.5 to 7.5. Non-ionic copolymers do therefore not comprise counterions such as chloride.

As used herein, the term "clay blocking agent" or "clay blocker" denotes substances to outcompete the dispersant in binding to the surface of clay particles and thereby either mask these clay particles, denying them access to the dispersant, or substantially flocculate the clay particles.

The subject non-ionic copolymer may have a weight average of the invention may have a weight average molecular weight within the range of 500 to 150,000 g/mol. A preferred range is from 10,000 to 120,000 g/mol, and particularly from 30,000 to 100,000 g/mol.

Preferred embodiments regarding the construction material compositions and the non-ionic copolymer according to the present invention as well as the use thereof are described in detail hereinafter. It is to be understood that the preferred embodiments of the invention are preferred alone or in combination with each other.

As indicated above, the present invention relates in one embodiment to a construction material composition comprising A) at least one non-ionic copolymer comprising residues based on the following monomer components:

i) monomer Component A, comprising an ethylenically unsaturated monomer comprising at least one alkyl amide moiety or at least one nitrogen-containing heterocyclic moiety, and ii) monomer Component B, comprising an ethylenically unsaturated monomer comprising at least one polyether moiety; and B) at least one inorganic binder based on calcium sulfate.

In one embodiment of the present invention, the at least one polyether moiety in monomer Component B comprises the structural unit (a)

$$*\text{—U—(C(O))}_k\text{—X-(AlkO)}_n\text{—W} \qquad \text{(a)}$$

wherein

* denotes the binding site to the polymer,

U is a chemical bond or a $C_1$-$C_8$-alkylene,

X is O, N, or $NR^1$, k is 0 or 1, n is an integer having a mean value of between 24 to 300, based on the whole non-ionic copolymer, Alk is $C_2$-$C_4$-alkylene, wherein Alk may be same or different within the group of $(AlkO)_n$, W is H, $C_1$-$C_6$-alkyl, aryl, or Y—F, Y is a linear or branched $C_2$-$C_8$-alkylene, which may further be substituted with a phenyl, F is a 5 to 10-membered nitrogen heterocycle, which is attached via a nitrogen to Y, wherein besides the nitrogen atom and carbon atoms 1, 2, or 3 additional heteroatoms selected from the group consisting of oxygen, nitrogen, and sulfur may be present as ring members and wherein the nitrogen ring members may be bond to a moiety $R^2$, and wherein 1 or 2 carbon ring members may be present as carbonyl, $R^1$ is H, $C_1$-$C_4$-alkyl, or benzyl, and $R^2$ is H, $C_1$-$C_4$-alkyl, or benzyl.

In a preferred embodiment, the at least one inorganic binder based on calcium sulfate is selected from calcium sulfate dihydrate, calcium sulfate hemihydrate, anhydrite, and mixtures thereof. In another preferred embodiment, the inorganic binder is a calcium sulfate based binder in its anhydrous form.

In a preferred embodiment of the present invention, the weight ratio of monomer Component B to monomer Component A is from 37/63 to 98/2, preferably from 39/61 to 97/3, more preferably from 45/55 to 96/4, in particular from 48/52 to 95/5.

In yet another preferred embodiment of the present invention, the molar ratio of monomer Component B to monomer Component A is from 1/200 to 1, preferably from 1/100 to 1/1.2, more preferably from 1/50 to 1/1.5, even more preferably from 1/20 to 1/2, still more preferably from 1/17 to 1/2.5, in particular from 1/12 to 1/3.

As indicated above, the present invention further relates in another embodiment to a construction material composition comprising A) at least one non-ionic copolymer comprising residues based on the following monomer components:

i) monomer Component A, comprising an ethylenically unsaturated monomer comprising at least one alkyl amide moiety or at least one nitrogen-containing heterocyclic moiety, and ii) monomer Component B, comprising an ethylenically unsaturated monomer comprising at least one polyether moiety, wherein the at least one polyether moiety in monomer Component B comprises the structural unit (a)

$$*—U—(C(O))_k—X\text{-}(AlkO)_n—W \quad (a)$$

wherein

* denotes the binding site to the polymer,

U is a chemical bond or a $C_2$-$C_8$-alkylene,

X is O, N, or $NR^1$, k is 0 or 1, n is an integer having a mean value of between 24 to 300, based on the whole non-ionic copolymer, Alk is $C_2$-$C_4$-alkylene, wherein Alk may be same or different within the group of $(AlkO)_n$, W is H, $C_1$-$C_6$-alkyl, aryl, or Y—F, Y is a linear or branched $C_2$-$C_8$-alkylene, which may further be substituted with a phenyl, F is a 5 to 10-membered nitrogen heterocycle, which is attached via a nitrogen to Y, wherein besides the nitrogen atom and carbon atoms 1, 2, or 3 additional heteroatoms selected from the group consisting of oxygen, nitrogen, and sulfur may be present as ring members and wherein the nitrogen ring members may be bond to a moiety $R^2$, and wherein 1 or 2 carbon ring members may be present as carbonyl, $R^1$ is H, $C_1$-$C_4$-alkyl, or benzyl, and $R^2$ is H, $C_1$-$C_4$-alkyl, or benzyl, with the proviso that k is 0 if U is a chemical bond; and B) at least one inorganic binder selected from a hydraulic binder or a latent hydraulic binder.

According to one embodiment of the present invention, the ethylenically unsaturated monomer comprising at least one polyether moiety, which is comprised in monomer Component B may further comprise at least one $C_1$-$C_6$-alkyl moiety, preferably at least one methyl.

In the following, preferred embodiments of the structural unit (a)

$$*—U—(C(O))_k—X\text{-}(AlkO)_n—W \quad (a)$$

are described in more detail.

In one embodiment, U is a chemical bond or a $C_2$-$C_6$-alkylene, preferably a chemical bond or a $C_2$-$C_4$-alkylene. In a preferred embodiment, U is a chemical bond, $C_2$-alkylene, or $C_4$-alkylene. In connection with the $C_2$-alklene, it is to be understood that U is presented by the following structural moiety "$—CH_2—CH_2—$".

In one embodiment, W is H, methyl, or $C_2$-$C_6$-alkyl.

In one embodiment, n is an integer having a mean value of between 20 to 280, preferably between 24 to 250, in particular between 24 to 150, based on the whole polymer.

In a preferred embodiment, the at least one polyether in monomer Component B comprises the structural unit (a)

$$*—U—(C(O))_k—X\text{-}(AlkO)_n—W \quad (a)$$

wherein

* denotes the binding site to the polymer,

U is a chemical bond, a $C_2$-alkylene, or a $C_4$-alkylene,

X is O, k is 0 or 1, n is an integer having a mean value of between 24 to 300, based on the whole polymer, Alk is $C_2$-$C_4$-alkylene, wherein Alk may be same or different within the group of $(AlkO)_n$, W is H or methyl.

In a preferred embodiment, the at least one polyether in monomer Component B comprises the structural unit (a)

$$*—U—(C(O))_k—X\text{-}(AlkO)_n—W \quad (a)$$

wherein

* denotes the binding site to the polymer,

U is a chemical bond,

X is O, k is 0, n is an integer having a mean value of between 24 to 300, based on the whole polymer, Alk is $C_2$— and $C_4$-alkylene, wherein Alk may be same or different within the group of $(AlkO)_n$, W is H In one preferred embodiment, at least one Alk within the group of $(AlkO)_n$ of structural unit (a) is a $C_4$-alkylene.

In this connection it is particularly preferred, if the structural unit (a) is represented by the structural unit (a*)

$$*—U—X—(CH_2—CH_2—CH_2—CH_2—O)\text{-}(AlkO)_n—W \quad (a^*)$$

wherein

* denotes the binding site to the polymer,

U is a chemical bond,

X is O, n is an integer having a mean value of between 24 to 300, based on the whole polymer, Alk is $C_2$-alkylene, W is H.

In another preferred embodiment, the at least one polyether in monomer Component B comprises the structural unit (a)

$$*—U—(C(O))_k—X\text{-}(AlkO)_n—W \quad (a)$$

wherein denotes the binding site to the polymer,

U is $C_2$-alkylene,

X is O, k is 0, n is an integer having a mean value of between 24 to 300, based on the whole polymer, Alk is $C_2$-alkylene, W is H.

In one embodiment of the present invention, the monomer Component A is an alkyl amide moiety. It is to be understood that the term alkyl amide moiety comprises monoalkyl amides such as in methylamide and dialkyl amides such as in N,N-dimethylacrylamide.

In another embodiment of the present invention, the monomer Component A is a nitrogen-containing heterocyclic moiety. According to the present invention the nitrogen-containing heterocyclic moiety exemplarily includes exemplarily 1-vinyl-2-pyrrolidinone, 1-Vinylimidazole, 1-vinyl-1,2,4-triazole, 4-vinylpyridine, N-vinylcaprolactam, and 1-vinylimidazole.

In one embodiment of the present invention, the monomer Component A is selected from the group consisting of N,N-dimethylacrylamide, N,N-dimethylmetacrylamide, N,N-diethylacrylamide, N,N-diethylmethacrylamide, 1-vinyl-2-pyrrolidinone, N-vinylcaprolactam, 4-acryloylmorpholine, N-methyl-N-vinylacetamide, 1-vinylimidazole, 4-vinylpyridine, and 1-vinyl-1,2,4-triazole. Preferably, the monomer Component A is N,N-dimethylacrylamide.

In a preferred embodiment of the present invention, the weight ratio of monomer Component B to monomer Component A is from 37/63 to 98/2, preferably from 39/61 to 97/3, more preferably from 45/55 to 96/4, in particular from 48/52 to 95/5.

In yet another preferred embodiment of the present invention, the molar ratio of monomer Component B to monomer Component A is from 1/200 to 1, preferably from 1/100 to 1/1.2, more preferably from 1/50 to 1/1.5, even more preferably from 1/20 to 1/2, still more preferably from 1/17 to 1/2.5, in particular from 1/12 to 1/3.

In one embodiment of the present invention, the non-ionic copolymer further comprises residues based on a monomer Component C having the formula (1)

(1)

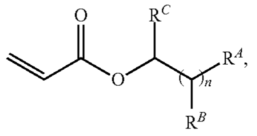

wherein $R^A$ is H, OH, ($C_1$-$C_3$-alkylene)-OH, or $C_1$-$C_3$-alky;

$R^B$ is H, OH, ($C_1$-$C_3$-alkylene)-OH, or $C_1$-$C_3$-alky;

$R^C$ is H, OH, ($C_1$-$C_3$-alkylene)-OH, or $C_1$-$C_3$-alky; and n is an integer from 0 to 10.

Preferably, monomer Component C has the formula (1)

(1)

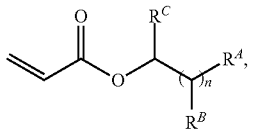

wherein $R^A$ is H, OH, or ($C_1$-$C_3$-alkylene)-OH;

$R^B$ is H, OH, or ($C_1$-$C_3$-alkylene)-OH;

$R^C$ is H, OH, or ($C_1$-$C_3$-alkylene)-OH; and n is an integer from 1 to 5.

In one embodiment of the present invention, monomer Component C has the formula (1a), (1 b), (1c), or (1d)

(1a)

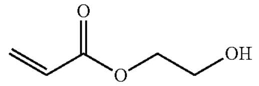

(1b)

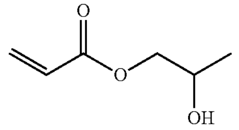

(1c)

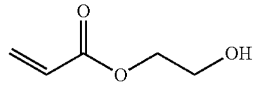

(1d)

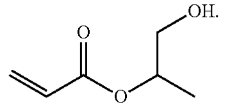

In a particular embodiment of the present invention, monomer Component C has the formula (1a) or (1b)

(1a)

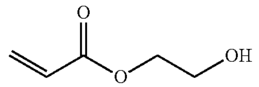

(1b)

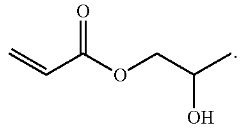

In one embodiment of the present invention, the construction material composition further comprises C) a plasticizer.

All known in the art plasticizers may be used. The term "plasticizer" and "dispersant" may be used interchangeable.

In one embodiment, the plasticizer is a water-soluble comb polymer. In a preferred embodiment, the water-soluble comb polymer is present as a copolymer which contains, on the main chain, side chains having ether functions and acid functions.

In one embodiment, the water-soluble comb polymer is present as a copolymer which is produced by free radical polymerization in the presence of acid monomer, preferably carboxylic acid monomer, and polyether macromonomer, so that altogether at least 45 mol %, preferably at least 80 mol %, of all structural units of the copolymer are produced by incorporation of acid monomer, preferably carboxylic acid monomer, and polyether macromonomer in the form of polymerized units. Acid monomer is to be understood as meaning monomers which are capable of free radical copolymerization, have at least one carbon double bond, contain at least one acid function, preferably a carboxylic acid function, and react as an acid in an aqueous medium. Furthermore, acid monomer is also to be understood as meaning monomers which are capable of free radical copolymerization, have at least one carbon double bond, form at least one acid function, preferably a carboxylic acid function, in an aqueous medium as a result of a hydrolysis reaction and react as an acid in an aqueous medium (example: maleic anhydride or hydrolysable esters of (meth) acrylic acid).

In the context of the plasticizer, polyether macromonomers are compounds which are capable of free radical copolymerization, have at least one carbon double bond, and have at least two ether oxygen atoms, with the proviso that the polyether macromonomer structural units present in the copolymer have side chains which contain at least two ether oxygen atoms, preferably at least 4 ether oxygen atoms, more preferably at least 8 ether oxygen atoms, most preferably at least 15 ether oxygen atoms.

Structural units, which do not constitute an acid monomer or a polyether macromonomer can be for example styrene and derivatives of styrene (for example methyl substituted derivatives), vinyl acetate, vinyl pyrrolidon, butadiene, vinyl proprionate, unsaturated hydrocarbons like for example ethylene, propylene and/or (iso)butylene. This listing is a non-exhaustive enumeration. Preferable are monomers with not more than one carbon double bond.

In a preferred embodiment, the water-soluble comb-polymer is a copolymer of styrene and a half ester of maleic acid with a monofunctional polyalkylene glycol. Preferably such a copolymer can be produced by free radical polymerization of the monomers styrene and maleic anhydride (or maleic acid) in a first step. In the second step polyalkylene glycols, preferably alkyl polyalkylene glycols (preferably alkyl polyethylene glycols, most preferably methyl polyethyleneglycol) are reacted with the copolymer of styrene and maleic anhydride in order to achieve an esterification of the acid groups. Styrene can be completely or partially replaced by styrene derivatives, for example methyl substituted derivatives. Copolymers of this preferred embodiment are described in U.S. Pat. No. 5,158,996, the disclosure of which is incorporated into the present patent application.

Frequently, a structural unit is produced in the copolymer by incorporation of the acid monomer in the form polymerized units, which structural unit is in accordance with the general formulae (Ia), (Ib), (Ic) and/or (Id)

(Ia)

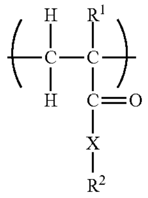

where $R^1$ are identical or different and are represented by H and/or a non-branched chain or a branched $C_1$-$C_4$ alkyl group;

X are identical or different and are represented by NH—$(C_nH_{2n})$ where n=1, 2, 3 or 4 and/or O—$(C_nH_{2n})$ where n=1, 2, 3 or 4 and/or by a unit not present;

$R^2$ are identical or different and are represented by OH, $SO_3H$, $PO_3H_2$, O—$PO_3H_2$ and/or para-substituted $C_6H_4$—$SO_3H$, with the proviso that, if X is a unit not present, $R^2$ is represented by OH;

(Ib)

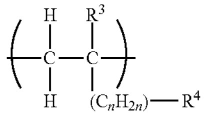

where $R^3$ are identical or different and are represented by H and/or a non-branched chain or a branched $C_1$-$C_4$ alkyl group;

n=0, 1, 2, 3 or 4

$R^4$ are identical or different and are represented by $SO_3H$, $PO_3H_2$, O—$PO_3H_2$ and/or para-substituted $C_6H_4$—$SO_3H$;

(Ic)

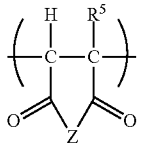

where $R^5$ are identical or different and are represented by H and/or a non-branched chain or a branched $C_1$-$C_4$ alkyl group;

Z are identical or different and are represented by O and/or NH;

(Id)

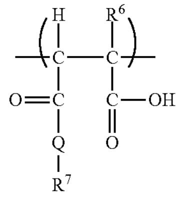

$R^6$ are identical or different and are represented by H and/or a non-branched chain or a branched $C_1$-$C_4$ alkyl group;

Q are identical or different and are represented by NH and/or O;

$R^7$ are identical or different and are represented by H, $(C_nH_{2n})$—$SO_3H$ where n=0, 1, 2, 3 or 4, preferably 1, 2, 3 or 4, $(C_n$—$H_{2n})$—OH where n=0, 1, 2, 3 or 4, preferably 1, 2, 3 or 4; $(C_nH_{2n})$—$PO_3H_2$ where n=0, 1, 2, 3 or 4, preferably 1, 2, 3 or 4, $(C_nH_{2n})$—$OPO_3H_2$ where n=0, 1, 2, 3 or 4, preferably 1, 2, 3 or 4, $(C_6H_4)$—$SO_3H$, $(C_6H_4)$—$PO_3H_2$, $(C_6H_4)$—$OPO_3H_2$ and/or $(C_mH_{2m})_e$—O-$(A'O)_\alpha$—$R^9$ where m=0, 1, 2, 3 or 4, preferably 1, 2, 3 or 4, e=0, 1, 2, 3 or 4, preferably 1, 2, 3 or 4, A'=$C_{x'}H_{2x'}$, where x'=2, 3, 4 or 5 and/or $CH_2C(C_6H_5)H$—, $\alpha$=an integer from 1 to 350 where $R^9$ are identical or different and are represented by a non-branched chain or a branched $C_1$-$C_4$ alkyl group.

Typically, a structural unit is produced in the copolymer by incorporation of the polyether macromonomer in the form of polymerized units, which structural unit is in accordance with the general formulae (IIa), (IIb) and/or (IIc)

(IIa)

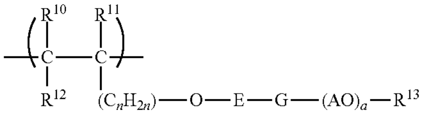

where $R^{10}$, $R^{11}$ and $R^{12}$ are in each case identical or different and, independently of one another, are represented by H and/or a non-branched chain or a branched $C_1$-$C_4$ alkyl group;

E are identical or different and are represented by a non-branched chain or branched $C_1$-$C_6$ alkylene group, preferably $C_2$-$C_6$ alkylene group, a cyclohexylen group, $CH_2$—$C_6H_{10}$, ortho-, meta- or para-substituted $C_6H_4$ and/or a unit not present;

G are identical or different and are represented by O, NH and/or C(═O)—NH, with the proviso that, if E is a unit not present, G is also present as a unit not present;

A are identical or different and are represented by $C_x$—$H_{2x}$ where x=2, 3, 4 and/or 5 (preferably x=2) and/or $CH_2CH(C_6H_5)$;

n are identical or different and are represented by 0, 1, 2, 3, 4 and/or 5;

a are identical or different and are represented by an integer from 2 to 350 (preferably 10-200);

$R^{13}$ are identical or different and are represented by H, a non-branched chain or a branched $C_1$-$C_4$ alkyl group, C(═O)—$NH_2$, and/or C(═O)$CH_3$;

(IIb)

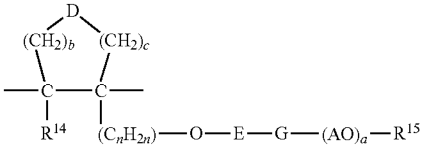

where $R^{14}$ are identical or different and are represented by H and/or a non-branched chain or branched $C_1$-$C_4$ alkyl group;

E are identical or different and are represented by a non-branched chain or branched $C_1$-$C_6$ alkylene group, preferably a $C_2$-$C_6$ alkylene group, a cyclohexylen group, $CH_2$—$C_6H_{10}$, ortho-, meta- or para-substituted $C_6H_4$ and/or by a unit not present;

G are identical or different and are represented by a unit not present, O, NH and/or C(═O)—NH, with the proviso that, if E is a unit not present, G is also present as a unit not present;

A are identical or different and are represented by $C_xH_{2x}$ where x=2, 3, 4 and/or 5 and/or $CH_2CH(C_6H_5)$;

n are identical or different and are represented by 0, 1, 2, 3, 4 and/or 5 a are identical or different and are represented by an integer from 2 to 350;

D are identical or different and are represented by a unit not present, NH and/or O, with the proviso that if D is a unit not present: b=0, 1, 2, 3 or 4 and c=0, 1, 2, 3 or 4, where b+c=3 or 4, and with the proviso that if D is NH and/or O, b=0, 1, 2 or 3, c=0, 1, 2 or 3, where b+c=2 or 3;

$R^{15}$ are identical or different and are represented by H, a non-branched chain or branched $C_1$-$C_4$alkyl group, C(═O)—$NH_2$, and/or C(═O)$CH_3$;

(IIc)

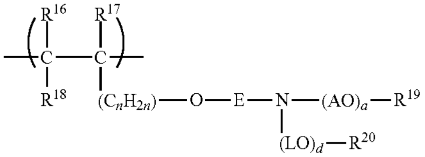

where $R^{16}$, $R^{17}$ and $R^{18}$ are in each case identical or different and, independently of one another, are represented by H and/or a non-branched chain or branched $C_1$-$C_4$ alkyl group;

E are identical or different and are represented by a non-branched chain or a branched $C_1$-$C_6$ alkylene group, preferably a $C_2$-$C_6$ alkylene group, a cyclohexylen group, $CH_2$—$C_6H_{10}$, ortho-, meta- or para-substituted $C_6H_4$ and/or by a unit not present; preferably E is not a unit not present;

A are identical or different and are represented by $C_xH_{2x}$ where x=2, 3, 4 and/or 5 and/or $CH_2CH(C_6H_5)$;

n are identical or different and are represented by 0, 1, 2, 3, 4 and/or 5;

L are identical or different and are represented by $C_xH_{2x}$ where x=2, 3, 4 and/or 5 and/or $CH_2$—$CH(C_6H_5)$;

a are identical or different and are represented by an integer from 2 to 350;

d are identical or different and are represented by an integer from 1 to 350;

$R^{19}$ are identical or different and are represented by H and/or a non-branched chain or a branched $C_1$-$C_4$ alkyl group, $R^{20}$ are identical or different and are represented by H and/or a non-branched chain $C_1$-$C_4$ alkyl group.

In a further embodiment, a structural unit is produced in the copolymer by incorporation of the polyether macromonomer in the form of polymerized units, which structural unit is in accordance with the general formula (IId)

(IId)

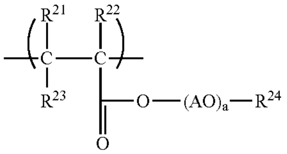

where $R^{21}$, $R^{22}$ and $R^{23}$ are in each case identical or different and, independently of one another, are represented by H and/or a non-branched chain or branched $C_1$-$C_4$ alkyl group;

A are identical or different and are represented by $C_xH_{2x}$ where x=2, 3, 4 and/or 5 and/or $CH_2CH(C_6H_5)$;

a are identical or different and are represented by an integer from 2 to 350;

$R^{24}$ are identical or different and are represented by H and/or a non-branched chain or a branched $C_1$-$C_4$ alkyl group, preferably a $C_1$-$C_4$ alkyl group.

Alkoxylated isoprenol and/or alkoxylated hydroxybutyl vinyl ether and/or alkoxylated (meth)allyl alcohol and/or vinylated methylpolyalkylene glycol having preferably in each case an arithmetic mean number of 4 to 340 oxyalkylene groups is preferably used as the polyether macromonomer. Methacrylic acid, acrylic acid, maleic acid, maleic anhydride, a monoester of maleic acid or a mixture of a plurality of these components is preferably used as the acid monomer.

In one embodiment the plasticizer is a composition, preferably aqueous hardening accelerator suspension, containing polycondensates, wherein the polycondensates contains (I) at least one structural unit consisting of an aromatic or heteroaromatic moiety bearing a polyether side chain, preferably a poly alkylene glycol side chain, more preferably a poly ethylene glycol side chain and (II) at least one structural unit consisting of an aromatic or heteroaromatic moiety bearing at least one phosphoric acid ester group and/or its salt.

Typically the structural units (I) and (II) of the polycondensate are represented by the following general formulae (I)

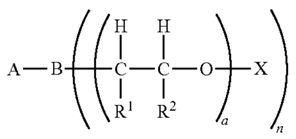

where

A are identical or different and are represented by a substituted or unsubstituted aromatic or heteroaromatic compound having 5 to 10 C atoms; where B are identical or different and are represented by N, NH or O; where n is 2 if B is N and n is 1 if B is NH or O; where $R^1$ and $R^2$, independently of one another, are identical or different and are represented by a branched or straight-chain $C_1$- to $C_{10}$-alkyl radical, $C_5$- to $C_8$-cycloalkyl radical, aryl radical, heteroaryl radical or H; where a are identical or different and are represented by an integer from 1 to 300; where X are identical or different and are represented by a branched or straight-chain $C_1$- to $C_{10}$-alkyl radical, $C_5$- to $C_8$-cycloalkyl radical, aryl radical, heteroaryl radical or H, preferably H (II)

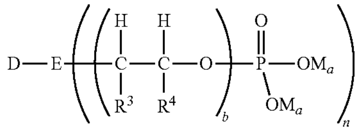

where

D are identical or different and are represented by a substituted or unsubstituted heteroaromatic compound having 5 to 10 C atoms; where E are identical or different and are represented by N, NH or O; where m is 2 if E is N and m is 1 if E is NH or O; where $R^3$ and $R^4$, independently of one another, are identical or different and are represented by a branched or straight-chain $C_1$- to $C_{10}$-alkyl radical, $C_5$- to $C_8$-cycloalkyl radical, aryl radical, heteroaryl radical or H; where b are identical or different and are represented by an integer from 1 to 300; where M is independently of one another alkaline metal ion, alkaline earth metal ion, ammonium ion, organic ammonium ion and/or H, a is 1 or in the case of alkaline earth metal ions 1/2.

Typically the molar ratio of the structural units (I):(II) is 1:10 to 10:1 preferably 1:8 to 1:1.

In a further embodiment, the polycondensate contains a further structural unit (III) which is represented by the following formula (III)

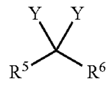

where

Y, independently of one another, are identical or different and are represented by (I), (II), or further constituents of the polycondensate; where $R^5$ are identical or different and are represented by H, $CH_3$, COOH or a substituted or unsubstituted aromatic or heteroaromatic compound having 5 to 10 C atoms; where $R^6$ are identical or different and are represented by H, $CH_3$, COOH or a substituted or unsubstituted aromatic or heteroaromatic compound having 5 to 10 C atoms.

Typically $R^5$ and $R^6$ in structural unit (III), independently of one another, are identical or different and are represented by H, COOH and/or methyl, preferably H.

Preferably the molar ratio of the structural units [(I)+(II)]:(III) is 1:0.8 to 3 in the polycondensate.

Preferably the hardening accelerator suspension contains a viscosity enhancer polymer, selected from the group of polysaccharide derivatives and/or (co)polymers with an average molecular weight Mw higher than 500.000 g/mol, more preferably higher than 1,000,000 g/mol the (co)polymers containing structural units derived (preferably by free radical polymerization) from non-ionic (meth)acrylamide monomer derivatives and/or sulphonic acid monomer derivatives. Preferably the viscosity enhancers are used at a dosage from 0.001 to 10 weight %, more preferably 0.001 to 1 weight % with respect to the weight of the hardening accelerator suspension. The viscosity enhancer polymer preferably should be dosed in a way that a plastic viscosity of the hardening accelerator suspensions higher than 80 mPa·s is obtained.

The preparation of the dispersants is, for example, described in EP3153482.

More preferably, the dispersant is selected from the group of polycarboxylate ethers (PCEs). In PCEs, the anionic groups are carboxylic groups and/or carboxylate groups. The PCE is preferably obtainable by radical copolymerization of a polyether macromonomer and a monomer comprising anionic and/or anionogenic groups. Preferably, at least 45 mol-%, preferably at least 80 mol-% of all structural units constituting the copolymer are structural units of the polyether macromonomer or the monomer comprising anionic and/or anionogenic groups.

Preferably, the plasticizer is a water-soluble comb polymer which is present as a copolymer which contains, on the main chain, side chains having ether functions and acid functions or a composition containing polycondensates, wherein the polycondensates contains (I) at least one structural unit consisting of an aromatic or heteroaromatic moiety bearing a polyether side chain, preferably a poly alkylene glycol side chain, more preferably a poly ethylene glycol side chain and (II) at least one structural unit consisting of an aromatic or heteroaromatic moiety bearing at least one phosphoric acid ester group and/or its salt.

As indicated above, the present invention further relates to a non-ionic copolymer comprising residues based on the following monomer components:

i) monomer Component A selected from the group consisting of N,N-dimethylacrylamide, N,N-dimethylmetacrylamide, N,N-diethylacrylamide, N,N-diethylmethacrylamide, 4-acryloylmorpholine, N-methyl-N-vinylacetamide, 4-vinylpyridine, and 1-vinyl-1,2,4-triazole, preferably N,N-dimethylacrylamide;

ii) monomer Component B, comprising an ethylenically unsaturated monomer comprising at least one polyether moiety comprising the structural unit (a)

$$*—U—(C(O))_k—X\text{-}(AlkO)_n—W \qquad (a)$$

wherein

* denotes the binding site to the polymer,

U is a chemical bond or a $C_2$-$C_8$-alkylene,

X is O, N, or $NR^1$, k is 0 or 1, n is an integer having a mean value of between 3 to 300, based on the whole non-ionic copolymer, Alk is $C_2$-$C_4$-alkylene, wherein Alk may be same or different within the group of $(AlkO)_n$, W is H, $C_1$-$C_6$-alkyl, aryl, or Y—F, Y is a linear or branched $C_2$-$C_8$-alkylene, which may further be substituted with a phenyl, F is a 5 to 10-membered nitrogen heterocycle, which is attached via a nitrogen to Y, wherein besides the nitrogen atom and carbon atoms 1, 2, or 3 additional heteroatoms selected from the group consisting of oxygen, nitrogen, and sulfur may be present as ring members and wherein the nitrogen ring members may be bond to a moiety $R^2$, and wherein 1 or 2 carbon ring members may be present as carbonyl, $R^1$ is H, $C_1$-$C_4$-alkyl, or benzyl, and $R^2$ is H, $C_1$-$C_4$-alkyl, or benzyl, with the proviso that k is 0 if U is a chemical bond; and iii) optionally monomer Component C, having the formula (1)

(1)

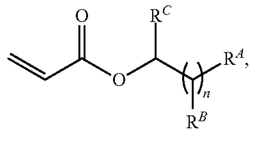

wherein $R^A$ is H, OH, ($C_1$-$C_3$-alkylene)-OH, or $C_1$-$C_3$-alky;

$R^B$ is H, OH, ($C_1$-$C_3$-alkylene)-OH, or $C_1$-$C_3$-alky;

$R^C$ is H, OH, ($C_1$-$C_3$-alkylene)-OH, or $C_1$-$C_3$-alky; and n is an integer from 0 to 10.

In one embodiment of the present invention, (i) the monomer Component A is N,N-dimethylacrylamide;

(ii) the at least one polyether moiety in monomer Component B comprises the structural unit (a)

$$*—U—(C(O))_k—X\text{-}(AlkO)_n—W \qquad (a)$$

wherein

* denotes the binding site to the polymer,

U is a chemical bond or a $C_2$-alkylene,

X is O, k is 0 or 1, n is an integer having a mean value of between 3 to 300, based on the whole non-ionic copolymer, Alk is $C_2$-$C_4$-alkylene, wherein Alk may be same or different within the group of $(AlkO)_n$, W is H or methyl, with the proviso that k is 0 if U is a chemical bond; and iii) optionally monomer Component C, having the formula (1)

(1)

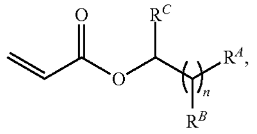

wherein $R^A$ is H, OH, ($C_1$-$C_3$-alkylene)-OH, or $C_1$-$C_3$-alky;

$R^B$ is H, OH, ($C_1$-$C_3$-alkylene)-OH, or $C_1$-$C_3$-alky;

$R^C$ is H, OH, ($C_1$-$C_3$-alkylene)-OH, or $C_1$-$C_3$-alky; and n is an integer from 1 to 5, and having preferably the formula (1a) or (1b)

(1a)

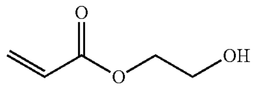

(1b)

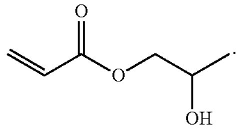

In one embodiment, the present invention relates to a construction material composition comprising at least one non-ionic copolymer as defined herein and at least one inorganic binder.

In another preferred embodiment, ii) the at least one polyether moiety in monomer Component B comprises the structural unit $$*—U—(C(O))_k—X\text{-}(AlkO)_n—W \qquad (a)$$

wherein

* denotes the binding site to the polymer,

U is a chemical bond or a $C_2$-$C_8$-alkylene,

X is O, N, or $NR^1$, k is 0 or 1, n is an integer having a mean value of between 24 to 300, based on the whole non-ionic copolymer, Alk is $C_2$-$C_4$-alkylene, wherein Alk may be same or different within the group of $(AlkO)_n$, W is H, $C_1$-$C_6$-alkyl, aryl, or Y—F, Y is a linear or branched $C_2$-$C_8$-alkylene, which may further be substituted with a phenyl, F is a 5 to 10-membered nitrogen heterocycle, which is attached via a nitrogen to Y, wherein besides the nitrogen atom and carbon atoms 1, 2, or 3 additional heteroatoms selected from the group consisting of oxygen, nitrogen, and sulfur may be present as ring members and wherein the nitrogen ring members may be bond to a moiety $R^2$, and wherein 1 or 2 carbon ring members may be present as carbonyl, $R^1$ is H, $C_1$-$C_4$-alkyl, or benzyl, and $R^2$ is H, $C_1$-$C_4$-alkyl, or benzyl, with the proviso that k is 0 if U is a chemical bond.

In a preferred embodiment, k is 0.

In a further preferred embodiment, the at least one polyether in monomer Component B comprises the structural unit (a)

$$*\!-\!U\!-\!(C(O))_k\!-\!X\!-\!(AlkO)_n\!-\!W \quad (a)$$

wherein

* denotes the binding site to the polymer,

U is a chemical bond,

X is O, k is 0, n is an integer having a mean value of between 24 to 300, based on the whole polymer, Alk is $C_2$— and $C_4$-alkylene, wherein Alk may be same or different within the group of $(AlkO)_n$, W is H In one preferred embodiment, at least one Alk within the group of $(AlkO)_n$ of structural unit (a) is a $C_4$-alkylene.

In this connection it is particularly preferred, if the structural unit (a) is represented by the structural unit (a*)

$$*\!-\!U\!-\!X\!-\!(CH_2\!-\!CH_2\!-\!CH_2\!-\!CH_2\!-\!O)\!-\!(AlkO)_n\!-\!W \quad (a^*)$$

wherein

* denotes the binding site to the polymer,

U is a chemical bond,

X is O, n is an integer having a mean value of between 24 to 300, based on the whole polymer, Alk is $C_2$-alkylene, W is H.

In another preferred embodiment, the at least one polyether in monomer Component B comprises the structural unit (a)

$$*\!-\!U\!-\!(C(O))_k\!-\!X\!-\!(AlkO)_n\!-\!W \quad (a)$$

wherein

* denotes the binding site to the polymer,

U is $C_2$-alkylene,

X is O, k is 0, n is an integer having a mean value of between 24 to 300, based on the whole polymer, Alk is $C_2$-alkylene, W is H.

In a preferred embodiment of the present invention, the weight ratio of monomer Component B to monomer Component A is from 37/63 to 98/2, preferably from 39/61 to 97/3, more preferably from 45/55 to 96/4, in particular from 48/52 to 95/5.

In yet another preferred embodiment of the present invention, the molar ratio of monomer Component B to monomer Component A is from 1/200 to 1, preferably from 1/100 to 1/1.2, more preferably from 1/50 to 1/1.5, even more preferably from 1/20 to 1/2, still more preferably from 1/17 to 1/2.5, in particular from 1/12 to 1/3.

According to the present invention, the inorganic binder may be a hydraulic binder, a latent hydraulic binder, or based on calcium sulfate (calcium sulfate based binder), or a mixture thereof.

In one embodiment, the present invention relates to a construction material composition comprising at least one non-ionic copolymer as defined herein and at least one inorganic binder, preferably selected from the group consisting of a hydraulic binder, a latent hydraulic binder, or an inorganic binder based on calcium sulfate.

In one embodiment of the present invention, the construction material comprises at least one additional inorganic binder selected from the group consisting of hydraulic binder, latent hydraulic binder, inorganic binder based on calcium sulfate, and mixtures thereof. In this connection it is to be understood that the construction material comprises at least two inorganic binder.

In a preferred embodiment, the at least one inorganic binder is a hydraulic binder, which is preferably selected from Portland cement, calcium aluminate cement, sulfoaluminate cement, and mixtures thereof, and is particularly preferably Portland cement. In certain preferred embodiment, the inorganic binder comprises aluminate cements in an amount of less than 10% by weight, preferably less than 5% by weight. In certain particularly preferred embodiments, the construction material composition is free of aluminate cements.

The mineralogical phases are indicated by their usual name followed by their cement notation. The primary compounds are represented in the cement notation by the oxide varieties: C for CaO, S for $SiO_2$, A for $Al_2O_3$, $ for $SO_3$, H for $H_2O$; this notation is used throughout.

The term "Portland cement" denotes any cement compound containing Portland clinker, especially CEM I, II, III, IV and V within the meaning of standard EN 197-1, paragraph 5.2. A preferred cement is ordinary Portland cement (OPC) according to DIN EN 197-1 which may either contain calcium sulfate (<7% by weight) or is essentially free of calcium sulfate (<1% by weight).

Calcium aluminate cement (also referred to as high aluminate cement) means a cement containing calcium aluminate phases. The term "aluminate phase" denotes any mineralogical phase resulting from the combination of aluminate (of chemical formula $Al_2O_3$, or "A" in cement notation), with other mineral species. The amount of alumina (in form of $Al_2O_3$) is ≥30% by weight of the total mass of the aluminate-containing cement as determined by means of X-ray fluorescence (XRF). More precisely, said mineralogical phase of aluminate type comprises tricalcium aluminate ($C_3A$), monocalcium aluminate (CA), mayenite ($C_{12}A_7$), tetracalcium aluminoferrite ($C_4AF$), or a combination of several of these phases.

Sulfoaluminate cement has a content of yeelimite (of chemical formula $4CaO \cdot 3Al_2O_3 \cdot SO_3$ or $C_4A_3\$$ in cement notation) of greater than 15% by weight.

In one preferred embodiment, the inorganic binder is a hydraulic binder, which is selected from Portland cement, calcium aluminate cement, sulfoaluminate cement, and mixtures thereof. In another preferred embodiment, the inorganic binder comprises a mixture of Portland cement and aluminate cement, or a mixture of Portland cement and sulfoaluminate cement or a mixture of Portland cement, aluminate cement and sulfoaluminate cement.

In an embodiment, where the construction material composition contains an aluminate-containing cement, the compositions may additionally contain at least one sulfate source, preferably calcium sulfate source. The calcium sulfate source may be selected from calcium sulfate dihydrate, anhydrite, α- and β-hemihydrate, i.e. α-bassanite and β-bassanite, or mixtures thereof. Preferably the calcium sulfate is α-bassanite and/or β-bassanite. In general, calcium sulfate is comprised in an amount of about 1 to about 20 weight %, based on the weight of the aluminate-containing cement. In a further embodiment, the construction material composition additionally contains at least one alkali metal sulfate like potassium sulfate or sodium sulfate, or aluminum sulfate.

Preferable are construction material compositions, which comprise a hydraulic binder and in which the weight percentage of sulfate with respect to the weight of clinker is from 4 to 14 weight %, preferably from 8 to 14 weight % most preferably from 9 to 13 weight %. The mass of sulfate is to be understood as the mass of the sulfate ion without the counterion. Preferably the sulfate is present in the form of calcium sulfate, more preferably in the form of α-bassanite and/or β-bassanite.

Addition of sulfate to hydraulic binders (cements), which are poor in the contents of sulfate helps to encourage the formation of ettringite and leads to a better early strength development.

The construction material compositions or building material formulations may also contain latent hydraulic binders and/or pozzolanic binders. For the purposes of the present invention, a "latent hydraulic binder" is preferably an inorganic binder in which the molar ratio (CaO+MgO):$SiO_2$ is from 0.8 to 2.5 and particularly from 1.0 to 2.0. In the context of the present invention, calcium sulfate based binders is also referred to as "gypsum". In general terms, the above-mentioned latent hydraulic binders can be selected from industrial and/or synthetic slag, in particular from blast furnace slag, electrothermal phosphorous slag, steel slag and mixtures thereof. The "pozzolanic binders" can generally be selected from amorphous silica, preferably precipitated silica, fumed silica and microsilica, ground glass, metakaolin, aluminosilicates, fly ash, preferably brown-coal fly ash and hard-coal fly ash, natural pozzolans such as tuff, trass and volcanic ash, natural and synthetic zeolites and mixtures thereof.

The slag can be either industrial slag, i.e. waste products from industrial processes, or else synthetic slag. The latter can be advantageous because industrial slag is not always available in consistent quantity and quality.

Blast furnace slag (BFS) is a waste product of the glass furnace process. Other materials are granulated blast furnace slag (GBFS) and ground granulated blast furnace slag (GGBFS), which is granulated blast furnace slag that has been finely pulverized. Ground granulated blast furnace slag varies in terms of grinding fineness and grain size distribution, which depend on origin and treatment method, and grinding fineness influences reactivity here. The Blaine value is used as parameter for grinding fineness, and typically has an order of magnitude of from 200 to 1000 $m^2$ $kg^{-1}$, preferably from 300 to 600 $m^2$ $kg^{-1}$. Finer milling gives higher reactivity.

For the purposes of the present invention, the expression "blast furnace slag" is however intended to comprise materials resulting from all of the levels of treatment, milling, and quality mentioned (i.e. BFS, GBFS and GGBFS). Blast furnace slag generally comprises from 30 to 45% by weight of CaO, about 4 to 17% by weight of MgO, about 30 to 45% by weight of $SiO_2$ and about 5 to 15% by weight of $Al_2O_3$, typically about 40% by weight of CaO, about 10% by weight of MgO, about 35% by weight of $SiO_2$ and about 12% by weight of $Al_2O_3$.

Electrothermal phosphorous slag is a waste product of electrothermal phosphorous production. It is less reactive than blast furnace slag and comprises about 45 to 50% by weight of CaO, about 0.5 to 3% by weight of MgO, about 38 to 43% by weight of $SiO_2$, about 2 to 5% by weight of $Al_2O_3$ and about 0.2 to 3% by weight of $Fe_2O_3$, and also fluoride and phosphate. Steel slag is a waste product of various steel production processes with greatly varying composition.

In one preferred embodiment, the inorganic binder is a calcium sulfate based binder, which is selected from calcium sulfate dihydrate, calcium sulfate hemihydrate, anhydrite, and mixtures thereof. In another preferred embodiment, the inorganic binder is a calcium sulfate based binder in its anhydrous form.

A particularly suitable latent hydraulic binder is blast furnace slag.

The latent hydraulic binder is, in general, comprised in an amount in the range from about 1 to about 30 wt %, based on the weight of the aluminate-containing cement.

In case the construction material composition contains low amount of hydraulic binder (e.g. 10%) an alkaline activator can be further added to promote strength development. Alkaline activators are preferably used in the inorganic binder system, such alkaline activators are for example aqueous solutions of alkali metal fluorides, alkali metal hydroxides, alkali metal aluminates or alkali metal silicates, such as soluble waterglass, and mixtures thereof.

In general, gypsum rock is mined or quarried and transported to the manufacturing facility. The manufacturer receives quarried gypsum, and crushes the large pieces before any further processing takes place. Crushed rock is then ground into a fine powder and heated to about 120-160 degrees C., driving off three-fourths of the chemically bound water in a process called "calcining", providing "calcined gypsum". Further heating of gypsum, slightly beyond 200° C. produces anhydrite gypsum ($CaSO_4$) that when mixed with water, sets very slowly. The calcined gypsum (hemihydrate or anhydrite) $CaSO_4 \cdot \frac{1}{2}H_2O$ or $CaSO_4$ are then used as the base for gypsum plaster, plaster of paris, gypsum board and other gypsum products. Products of the various calcinating procedures are alpha and beta-hemihydrate. Beta calcium sulfate hemihydrate results from rapid heating in open units with rapid evaporation of water forming cavities in the resulting anhydrous product. Alphahemihydrate is obtained by dehydrating gypsum in closed autoclaves. The crystals formed in this case are dense and therefore the resulting inorganic binder requires less water for rehydrating compared to beta-hemihydrate.

The typical natural gypsum sources that are commercially available often contain clay mineral and other impurities of up to 20% or more that results in reduced calcium sulfate levels.

Amorphous silica is preferably an X ray-amorphous silica, i.e. a silica for which the powder diffraction method reveals no crystallinity. The content of $SiO_2$ in the amorphous silica of the invention is advantageously at least 80% by weight, preferably at least 90% by weight. Precipitated silica is obtained on an industrial scale by way of precipitating processes starting from water glass. Precipitated silica from some production processes is also called silica gel.

Fumed silica is produced via reaction of chlorosilanes, for example silicon tetrachloride, in a hydrogen/oxygen flame. Fumed silica is an amorphous $SiO_2$ powder of particle diameter from 5 to 50 nm with specific surface area of from 50 to 600 $m_2$ $g^{-1}$.

Microsilica is a by-product of silicon production or ferrosilicon production, and likewise consists mostly of amorphous $SiO_2$ powder. The particles have diameters of the order of magnitude of 0.1 μm. Specific surface area is of the order of magnitude of from 10 to 30 $m^2$ $g^{-1}$.

Fly ash is produced inter alia during the combustion of coal in power stations. Class C fly ash (brown-coal fly ash) comprises according to WO 08/012438 about 10% by weight of CaO, whereas class F fly ash (hard-coal fly ash) comprises less than 8% by weight, preferably less than 4% by weight, and typically about 2% by weight of CaO.

Metakaolin is produced when kaolin is dehydrated. Whereas at from 100 to 200° C. kaolin releases physically bound water, at from 500 to 800° C. a dehydroxylation takes place, with collapse of the lattice structure and formation of metakaolin ($Al_2Si_2O_7$). Accordingly, pure metakaolin comprises about 54% by weight of $SiO_2$ and about 46% by weight of $Al_2O_3$.

For the purposes of the present invention, aluminosilicates are the abovementioned reactive compounds based on $SiO_2$ in conjunction with $Al_2O_3$ which harden in an aqueous alkali environment. It is of course not essential here that silicon and aluminium are present in oxidic form, as is the case by way of example in $Al_2Si_2O_7$. However, for the purposes of quantitative chemical analysis of aluminosilicates it is usual to state the proportions of silicon and aluminium in oxidic form (i.e. as "$SiO_2$" and "$Al_2O_3$").

Clay is the common name for a number of fine-grained, earthy materials that become plastic when wet and are mostly composed of phyllosilicate minerals containing variable amounts of water trapped in the mineral structure. There are many types of known clay minerals. Some of the more common types are: kaolinite, illite, chlorite, vermiculite and smectite, also known as montmorillonite, the latter two have pronounced ability to adsorb water.

Chemically, clays are hydrous aluminum silicates, usually containing alkaline metals, alkaline earth metals and/or iron. The clay mineral consists of sheets of interconnected silicates combined with a second sheet-like grouping of metallic atoms, oxygen, and hydroxyl, forming a two layer mineral as in kaolinite. Sometimes the latter sheet like structure is found sandwiched between two silica sheets, forming a three-layer mineral such as in vermiculite. Structurally, the clay minerals are composed of planes of cations, arranged in sheets, which may be tetrahedral or octahedral coordinated (with oxygen), which in turn are arranged into layers often described as 2:1 if they involve units composed of two tetrahedral and one octahedral sheet or 1:1 if they involve units of alternating tetrahedral and octahedral sheets. Additionally some 2:1 clay inerals have interlayer sites between successive 2:1 units which may be occupied by interlayer cations that are often hydrated. Clay minerals are divided by layer type, and within layer type, by groups based on charge x per formula unit (Guggenheim S. et al., Clays and Clay Minerals, 54 (6), 761-772, 2006). The charge per formula unit, x, is the net negative charge per layer, expressed as a positive number. Further subdivisions by subgroups are based on dioctahedral or trioctahedral character, and finally by species based on chemical composition e.g.

- $x\approx0$: pyrophyllite-group
- $x\approx0.2$-$0.6$: smectite-group e.g. montmorillonite, nontronite, saponite or hectorite
- $x\approx0.6$-$0.9$: vermiculite-group
- $x\approx1.8$-$2$: brittle mica-group e.g. clintonite, anandite, kinoshitalite.

The construction material composition can be for example concrete, mortar, cement paste, grouts, or a gypsum containing slurry. The term "cement paste" denotes the inorganic binder composition admixed with water.

The term "mortar" or "grout" denotes a cement paste to which are added fine granulates, i.e. granulates whose diameter is between 150 µm and 5 mm (for example sand), and optionally very fine granulates. A grout is a mixture of sufficiently low viscosity for filling in voids or gaps. Mortar viscosity is high enough to support not only the mortar's own weight but also that of masonry placed above it. The term "concrete" denotes a mortar to which are added coarse granulates, i.e. granulates with a diameter of greater than 5 mm.

The aggregate in this invention can be for example silica, quartz, sand, crushed marble, glass spheres, granite, limestone, sandstone, calcite, marble, serpentine, travertine, dolomite, feldspar, gneiss, alluvial sands, any other durable aggregate, and mixtures thereof. The aggregates are often also called fillers and in particular do not work as an inorganic binder.

The scope and interest of the invention will be better understood based on the following examples which are intended to illustrate certain embodiments of the invention and are non-limitative.

In one embodiment, the present invention relates to a construction material as defined herein, wherein a hydraulic binder is comprised, which is preferably selected from the group consisting of Portland cement, calcium aluminate cement, sulfoaluminate cement, and mixtures thereof and/or wherein a latent hydraulic binder is comprised, which is preferably blast furnace slag.

In one embodiment D3 of the first, second, and fourth aspect, an inorganic binder based on calcium sulfate is comprised, which is in its anhydrous or hydrous forms, and which is preferably calcined gypsum.

In another embodiment, the present invention relates to the use of a non-ionic copolymer comprising residues based on the following monomer components:

i) monomer Component A, comprising an ethylenically unsaturated monomer comprising at least one alkyl amide moiety or at least one nitrogen-containing heterocyclic moiety;

ii) monomer Component B, comprising an ethylenically unsaturated monomer comprising at least one polyether moiety comprising the structural unit (a)

$$*\text{—U—(C(O))}_k\text{—X-(AlkO)}_n\text{—W} \quad (a)$$

wherein

* denotes the binding site to the polymer,

U is a chemical bond or a $C_1$-$C_8$-alkylene,

X is O, N, or $NR^1$, k is 0 or 1, n is an integer having a mean value of between 3 to 300, based on the whole non-ionic copolymer, Alk is $C_2$-$C_4$-alkylene, wherein Alk may be same or different within the group of $(AlkO)_n$, W is H, $C_1$-$C_6$-alkyl, aryl, or Y—F, Y is a linear or branched $C_2$-$C_8$-alkylene, which may further be substituted with a phenyl, F is a 5 to 10-membered nitrogen heterocycle, which is attached via a nitrogen to Y, wherein besides the nitrogen atom and carbon atoms 1, 2, or 3 additional heteroatoms selected from the group consisting of oxygen, nitrogen, and sulfur may be present as ring members and wherein the nitrogen ring members may be bond to a moiety $R^2$, and wherein 1 or 2 carbon ring members may be present as carbonyl, $R^1$ is H, $C_1$-$C_4$-alkyl, or benzyl, and $R^2$ is H, $C_1$-$C_4$-alkyl, or benzyl; and iii) optionally monomer Component C, having the formula (1)

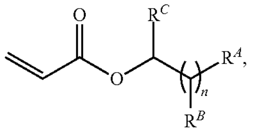

(1)

wherein $R^A$ is H, OH, ($C_1$-$C_3$-alkylene)-OH, or $C_1$-$C_3$-alky;

$R^B$ is H, OH, ($C_1$-$C_3$-alkylene)-OH, or $C_1$-$C_3$-alky;

$R^C$ is H, OH, ($C_1$-$C_3$-alkylene)-OH, or $C_1$-$C_3$-alky; and n is an integer from 0 to 10, in a construction material composition for modifying robustness against clay deviations, preferably without retarding the set time of the construction material composition.

In a preferred embodiment, k is 0 if U is a chemical bond.

In a further preferred embodiment, k is 0.

In yet a further preferred embodiment, the at least one polyether in monomer Component B comprises the structural unit (a)

$$*—U—(C(O))_k—X\text{-}(AlkO)_n—W \quad (a)$$

wherein denotes the binding site to the polymer,

U is a chemical bond,

X is O, k is 0, n is an integer having a mean value of between 24 to 300, based on the whole polymer, Alk is $C_2$— and $C_4$-alkylene, wherein Alk may be same or different within the group of $(AlkO)_n$, W is H.

In one preferred embodiment, at least one Alk within the group of $(AlkO)_n$ of structural unit (a) is a $C_4$-alkylene.

In this connection it is particularly preferred, if the structural unit (a) is represented by the structural unit (a*)

$$*—U—X—(CH_2—CH_2—CH_2—CH_2—O)\text{-}(AlkO)_n—W \quad (a^*)$$

wherein denotes the binding site to the polymer,

U is a chemical bond,

X is O, n is an integer having a mean value of between 24 to 300, based on the whole polymer, Alk is $C_2$-alkylene, W is H.

In another preferred embodiment, the at least one polyether in monomer Component B comprises the structural unit (a)

$$*—U—(C(O))_k—X\text{-}(AlkO)_n—W \quad (a)$$

wherein denotes the binding site to the polymer,

U is $C_2$-alkylene,

X is O, k is 0, n is an integer having a mean value of between 24 to 300, based on the whole polymer, Alk is $C_2$-alkylene, W is H.

In one embodiment of the present invention, the monomer Component A is an alkyl amide moiety. It is to be understood that the term alkyl amide moiety comprises monoalkyl amides such as in methylamide and dialkyl amides such as in N,N-dimethylacrylamide.

In another embodiment of the present invention, the monomer Component A is a nitrogen-containing heterocyclic moiety. According to the present invention the nitrogen-containing heterocyclic moiety exemplarily includes exemplarily 1-vinyl-2-pyrrolidinone, 1-Vinylimidazole, 1-vinyl-1,2,4-triazole, 4-vinylpyridine, N-vinylcaprolactam, and 1-vinylimidazole.

In one embodiment of the present invention, the monomer Component A is selected from the group consisting of N,N-dimethylacrylamide, N,N-dimethylmetacrylamide, N,N-diethylacrylamide, N,N-diethylmethacrylamide, 1-vinyl-2-pyrrolidinone, N-vinylcaprolactam, 4-acryloylmorpholine, N-methyl-N-vinylacetamide, 1-vinylimidazole, 4-vinylpyridine, and 1-vinyl-1,2,4-triazole, preferably from the group consisting of N,N-dimethylacrylamide, N,N-dimethylmetacrylamide, N,N-diethylacrylamide, N,N-diethylmethacrylamide, 4-acryloylmorpholine, N-methyl-N-vinylacetamide, 4-vinylpyridine, and 1-vinyl-1,2,4-triazole. In particular, the monomer Component A is N,N-dimethylacrylamide.

In a preferred embodiment of the present invention, the weight ratio of monomer Component B to monomer Component A is from 37/63 to 98/2, preferably from 39/61 to 97/3, more preferably from 45/55 to 96/4, in particular from 48/52 to 95/5.

In yet another preferred embodiment of the present invention, the molar ratio of monomer Component B to monomer Component A is from 1/200 to 1, preferably from 1/100 to 1/1.2, more preferably from 1/50 to 1/1.5, even more preferably from 1/20 to 1/2, still more preferably from 1/17 to 1/2.5, in particular from 1/12 to 1/3.

In another embodiment, the present invention relates to the use of the non-ionic copolymer as defined herein in a construction material composition for modifying robustness against clay deviations, preferably without retarding the set time of the construction material composition. In yet another embodiment, the present invention relates to the use of the non-ionic copolymer as defined herein in a construction material composition in a pretreatment of compositions comprising the non-ionic copolymer prior the addition of an inorganic binder. It is to be understood that in such a pretreatment, no plasticizer is present.

In one embodiment, the present invention relates to the use of construction material composition as defined herein, in dry mortar mixtures or in a concrete construction application, preferably in production of plate materials, self-leveling under or overlayments, screeds, repair mortars, grouts, plasters, tile adhesives.

Further embodiments of the present application relate to:

1. A non-ionic copolymer comprising residues based on the following monomer components:
   - i) monomer Component A, comprising an ethylenically unsaturated monomer comprising at least one alkyl amide moiety or at least one nitrogen-containing heterocyclic moiety;
   - ii) monomer Component B, comprising an ethylenically unsaturated monomer comprising at least one polyether moiety comprising the structural unit (a)

$$*—U—(C(O))_k—X\text{-}(AlkO)_n—W \quad (a)$$

wherein

* denotes the binding site to the polymer,

U is a chemical bond or a $C_2$-$C_8$-alkylene,

X is O, N, or $NR^1$, k is 0 or 1, n is an integer having a mean value of between 3 to 300, based on the whole non-ionic copolymer, Alk is $C_2$-$C_4$-alkylene, wherein Alk may be same or different within the group of $(AlkO)_n$, W is H, $C_1$-$C_6$-alkyl, aryl, or Y—F, Y is a linear or branched $C_2$-$C_8$-alkylene, which may further be substituted with a phenyl, F is a 5 to 10-membered nitrogen heterocycle, which is attached via a nitrogen to Y, wherein besides the nitrogen atom and carbon atoms 1, 2, or 3 additional heteroatoms selected from the group consisting of oxygen, nitrogen, and sulfur may be present as ring members and wherein the nitrogen ring members may be bond to a moiety $R^2$, and wherein 1 or 2 carbon ring members may be present as carbonyl, $R^1$ is H, $C_1$-$C_4$-alkyl, or benzyl, and $R^2$ is H, $C_1$-$C_4$-alkyl, or benzyl, with the proviso that k is 0 if U is a chemical bond; and iii) optionally monomer Component C, having the formula (1)

(1)

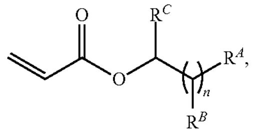

wherein $R^A$ is H, OH, ($C_1$-$C_3$-alkylene)-OH, or $C_1$-$C_3$-alky;

$R^B$ is H, OH, ($C_1$-$C_3$-alkylene)-OH, or $C_1$-$C_3$-alky;

$R^C$ is H, OH, ($C_1$-$C_3$-alkylene)-OH, or $C_1$-$C_3$-alky; and n is an integer from 0 to 10.

2. The non-ionic copolymer according to embodiment 1, wherein (i) the monomer Component A is selected from the group consisting of N,N-dimethylacrylamide, N,N-dimethylmetacrylamide, N,N-diethylacrylamide, N,N-diethylmethacrylamide, 1-vinyl-2-pyrrolidinone, N-vinylcaprolactam, 4-acryloylmorpholine, N-methyl-N-vinylacetamide, 1-vinylimidazole, 4-vinylpyridine, and 1-vinyl-1,2,4-triazole, and is preferably N,N-dimethylacrylamide;

(ii) the at least one polyether moiety in monomer Component B comprises the structural unit (a)

$$*—U—(C(O))_k—X\text{-}(AlkO)_n—W \qquad (a)$$

wherein

* denotes the binding site to the polymer,

U is a chemical bond or a $C_2$-alkylene,

X is O, k is 0 or 1, n is an integer having a mean value of between 3 to 300, based on the whole non-ionic copolymer, Alk is $C_2$-$C_4$-alkylene, wherein Alk may be same or different within the group of $(AlkO)_n$, W is H or methyl, with the proviso that k is 0 if U is a chemical bond; and iii) optionally monomer Component C, having the formula (1)

(1)

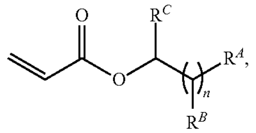

wherein $R^A$ is H, OH, ($C_1$-$C_3$-alkylene)-OH, or $C_1$-$C_3$-alky;

$R^B$ is H, OH, ($C_1$-$C_3$-alkylene)-OH, or $C_1$-$C_3$-alky;

$R^C$ is H, OH, ($C_1$-$C_3$-alkylene)-OH, or $C_1$-$C_3$-alky; and n is an integer from 1 to 5, and having preferably the formula (1a) or (1b)

(1a)

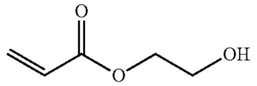

(1b)

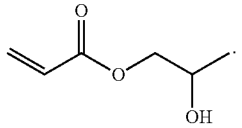

3. A construction material composition comprising at least one non-ionic copolymer according to embodiment 1 or 2 and at least one inorganic binder, preferably wherein the at least one inorganic binder is a hydraulic binder, a latent hydraulic binder, or an inorganic binder based on calcium sulfate.

4. The construction material composition according to embodiment 3, wherein the construction material comprises at least one additional inorganic binder selected from the group consisting of hydraulic binder, latent hydraulic binder, inorganic binder based on calcium sulfate, and mixtures thereof.

5. The construction material composition according embodiment 3 or 4, wherein a hydraulic binder is comprised, which is preferably selected from the group consisting of Portland cement, calcium aluminate cement, sulfoaluminate cement, and mixtures thereof and/or wherein a latent hydraulic binder is comprised, which is preferably blast furnace slag.

6. The construction material composition according to any one of embodiments 3 to 5, wherein an inorganic binder based on calcium sulfate is comprised, which is in its anhydrous or hydrous forms, and which is preferably calcined gypsum.

7. Use of the non-ionic copolymer according to embodiment 1 or 2 in a construction material composition for modifying robustness against clay deviations, preferably without retarding the set time of the construction material composition or in a pretreatment of compositions comprising the non-ionic copolymer prior the addition of an inorganic binder.

8. Use of the construction material composition according to embodiment 3 in dry mortar mixtures or in a concrete construction application, preferably in production of plate materials, self-leveling under or overlayments, screeds, repair mortars, grouts, plasters, tile adhesives.

EXAMPLES

Measuring Methods

GPC measurements were performed on a Waters Alliance 2695 separation module.

$M_W$ were determined by GPC using the columns Shodex OH(pak) SB-804 HQ and SB-802.5 HQ (Showa Denko K.K.) calibrated with PEG/PEO or PSS (sodium salt) or PAA (sodium salt).

Polycarboxylic Ether (Melflux® 4930 F) was purchased from BASF SE in powder form.

Polydiallyldimethylammonium chloride (PolyDADMAC) had a solid content of greater than 85 wt.-% in water and a viscosity at 20° C., 25% solution=370 mPas.

Bentonite was purchased from Alfa Aesar.

Used Portland cement was a CEM I 52.5 N.

Example 2

In a 1 liter four-necked flask equipped with stirrer, a thermometer, a reflux condenser and metering pump was charged with 100 g of water and 400 g (0.13 mol) of vinyloxybutylpolyethyleneglycol 3000 (prepared by ethoxylation of hydroxybutylvinylether with 66 mol of ethylene oxide). After warming the mixture to 75° C., 0.5 g 2,2'-Azobis(2-methylpropionamidine)dihydrochloride (V-50, from Wako) was added. After a short stirring time, a mixture of 400 g water, 66 g (0.65 mol) dimethylacrylamide (DMAA, 98%) and 1 g of 2,2'-Azobis(2-methylpropionamidine)dihydrochloride (V-50, from Wako) were added within 45 min. During the dosage, the temperature rises to about 83° C. and the viscosity increases significantly. After dosing, the solution is kept at 80° C. for 45 min.

This gave the aqueous solution of a copolymer having an average molecular weight of Mw=51,518 g/mol (determined by GPC) and a solids content of 53.4%.

Example 3

In a 1 liter four-necked flask equipped with stirrer, a thermometer, a reflux condenser and metering pump was charged with 100 g of water and 400 g (0.36 mol) of vinyloxybutylpolyethyleneglycol 1100 (prepared by ethoxylation of hydroxybutylvinylether with 24 mol of ethylene oxide). After warming the mixture to 75° C., 0.5 g 2,2'-Azobis(2-methylpropionamidine)dihydrochloride (V-50, from Wako) was added. After a short stirring time, a mixture of 400 g water, 184 g (1.81 mol) dimethylacrylamide (DMAA, 98%) and 1 g of 2,2'-Azobis(2-methylpropionamidine)dihydrochloride (V-50, from Wako) were added within 45 min. During the dosage, the temperature rises to about 85° C. and the viscosity increases significantly. After dosing, the solution is kept at 80° C. for 45 min.

This gave the aqueous solution of a copolymer having an average molecular weight of Mw=56,072 g/mol (determined by GPC) and a solids content of 54.2%.

Example 4

In a 1 liter four-necked flask equipped with stirrer, a thermometer, a reflux condenser and metering pump was charged with 100 g of water and 400 g (0.13 mol) of vinyloxybutylpolyethyleneglycol 3000 (prepared by ethoxylation 1 of hydroxybutylvinylether with 66 mol of ethylene oxide). After warming the mixture to 75° C., 0.5 g 2,2'-Azobis(2-methylpropionamidine)dihydrochloride (V-50, from Wako) was added. After a short stirring time, a mixture of 400 g water, 121 g (2.0 mol) dimethylacrylamide (DMAA, 98%), 3 g of mercaptoethanol and 1 g of 2,2'-Azobis(2-methylpropionamidine)dihydrochloride (V-50, from Wako) were added within 45 min. During the dosage, the temperature rises to about 81° C. and the viscosity increases significantly. After dosing, the solution is kept at 80° C. for 45 min.

This gave the aqueous solution of a copolymer having an average molecular weight of Mw=31,544 g/mol (determined by GPC) and a solids content of 51.3%.

Example 5

In a 1 liter four-necked flask equipped with stirrer, a thermometer, a reflux condenser and metering pump was charged with 100 g of water and 400 g (0.17 mol) of Methallyl polyethylene glycol-2400. After warming the mixture to 75° C., 0.5 g 2,2'-Azobis(2-methylpropionamidine)dihydrochloride (V-50, from Wako) was added. After a short stirring time, a mixture of 400 g water, 84 g (0.83 mol) dimethylacrylamide (DMAA, 98%) and 1 g of 2,2'-Azobis(2-methylpropionamidine)dihydrochloride (V-50, from Wako) were added within 45 min. During the dosage, the temperature rises to about 82° C. and the viscosity increase significantly. After dosing, the solution is kept at 80° C. for 45 min.

This gave the aqueous solution of a copolymer having an average molecular weight of Mw=77,167 g/mol (determined by GPC) and a solids content of 53.1%.

In order to evaluate the robustness of the different clay blocking agents all of them were mixed with Melflux 4930 in a 70/30 ratio and dosed to a similar initial flow value without additional clay contamination. As a clay source sodium bentonite was used. As a reference the pure superplasticizer Melflux 4930 and PolyDADMAC was used.

The cement mortar was prepared on the basis of the method described in DIN EN 196-1. The additive mixture was dissolved in the mixing water (w/c=0.35) and the dry mortar mixture comprising 900 g of Portland cement and 1350 g of Normensand (DIN EN 196-1 available from Normensand GmbH) was added. Thereafter, mixing was started at low speed (140 rpm). After 60 s mixing speed was increased (285 rpm) and continued for 30 s. Then, the mixing was stopped for 90 s and continued afterwards for 60 s at 285 rpm.

Immediately after the mixing process the slump flow of the samples was determined using the Haegermann cone. The testing method was on the basis of SVB-Richtlinie des Deutschen Ausschusses für Stahlbeton (Deutscher Ausschuss für Stahlbetonbau (Ed.): DAfStb-Richtlinie Selbstverdichtender Beton (SVB-Richtlinie) Berlin, 2003).

The Haegermann cone (d at the top=70 mm, d at the bottom=100 mm, h=60 mm) was placed in the middle of a dry glass plate having a diameter of 400 mm and filled with the cement mortar. 5 min. after the first contact between cement and water the cone was lifted and the average diameter of the formed cake was determined.

The results of the mortar tests are summarized in the following table:

| Example | Superplasticizer Mixture | Total Dosage Superplasticizer Mixture/ bwob % | Amount Sodium Bentonite/ bwob % | Slump Flow at 5 min/ cm |
|---|---|---|---|---|
| Comparative Example 1 | Melflux 4930 L | 0.125 | 0.000 | 27.7 |
| Comparative Example 1 | Melflux 4930 L | 0.125 | 0.500 | 15.3 |
| Inventive Example 1 | 70% Melflux 4930 L/ 30% Example 2 | 0.157 | 0.000 | 28.7 |
| Inventive Example 1 | 70% Melflux 4930 L/ 30% Example 2 | 0.157 | 0.500 | 25.1 |
| Inventive Example 2 | 70% Melflux 4930 L/ 30% Example 3 | 0.155 | 0.000 | 27.4 |
| Inventive Example 2 | 70% Melflux 4930 L/ 30% Example 3 | 0.155 | 0.500 | 21.6 |
| Inventive Example 3 | 70% Melflux 4930 L/ 30% Example 4 | 0.167 | 0.000 | 28.8 |

-continued

| Example | Superplasticizer Mixture | Total Dosage Super-plasticizer Mixture/ bwob % | Amount Sodium Bentonite/ bwob % | Slump Flow at 5 min/ cm |
|---|---|---|---|---|
| Inventive Example 3 | 70% Melflux 4930 L/ 30% Example 4 | 0.167 | 0.500 | 25.6 |
| Inventive Example 4 | 70% Melflux 4930 L/ 30% Example 5 | 0.162 | 0.000 | 27.4 |
| Inventive Example 4 | 70% Melflux 4930 L/ 30% Example 5 | 0.162 | 0.500 | 23.0 |
| Comparative Example 2 | 70% Melflux 4930 L/ 30% PolyDADMAC | 0.180 | 0.000 | 28.4 |
| Comparative Example 2 | 70% Melflux 4930 L/ 30% PolyDADMAC | 0.180 | 0.500 | 21.1 |

All of the inventive examples do show a significant improved robustness with respect to clay contamination (less loss of slump flow if sodium bentonite is added). Also compared to state of the art clay blocking agents (e.g. PolyDADMAC) having in addition further draw backs such as chloride content all shown inventive examples do show a further significant improvement with respect to clay robustness.

Gypsum Slurries

In addition, tests with respect to clay robustness were performed in a gypsum wallboard test system. As dispersant Melflux PCE 1493 L/40% N.D. (from BASF) was used. Besides the inventive copolymers as clay blockers also PolyDADMAC was used as reference for comparative example 1. The clay contamination was introduced via the gypsum source.

The used hemihydrate had the following composition.

| $CaSO_4$ * ½ $H_2O$/wt % | $CaSO_4$ | dolomite | silica | clay minerals | others |
|---|---|---|---|---|---|
| 85.1 | 0.2 | 7.1 | 1.5 | 0.7 | 5.4 |

At a constant level of dispersant, the necessary amount of clay blocker was determined. All tests were performed at the same setting time evaluated by a knife cutting test procedure and the same wet-density, ensured by dosing the necessary amount of foam.

Preparation of Foam:

Foam based on fatty alkyl ether sulfate was produced in the following way:

A tenside solution, containing 0.5% of Vinapor GYP 2680 (from BASF), was filled in a supply tank and routed to a foam generator. By use of a stator rotor system, and by addition of compressed air, the tenside solution was transferred into foam. The adjusted foam density was 75 g/L.

Estimation of Initial Setting:

Initial setting was determined with the so-called knife-cut method (analogous to DIN EN 13279-2).

Estimation of Flow:

Flow was determined after a time of 60 seconds. After adding powder components to liquid, the stucco had to soak for 15 seconds. Then the slurry was mixed for 30 seconds with a Hobart mixer. After a total time of 45 seconds a cylinder was filled with the stucco slurry up to the top edge and lifted after 60 seconds. At the end the patty diameter was measured with a caliper rule on two perpendicular axes.

Comparative Example 3

A mixture of 350 g stucco (β-hemihydrate from natural source) and 1.35 g accelerator (fine milled dehydrate from ball mill to adjust a setting time of about 2:20 min) was interspersed in liquid. Liquid consists of 0.035 g of Plast-retard (from Sicit 2000), 0.49 g of Melflux PCE 1493 L (from BASF), 0.210 g of PolyDADMAC and 192.03 g of water. Then the powder had to soak in liquid for 15 seconds. Afterwards the slurry was mixed with the Hobart mixer at level II (285 rpm) for 30 seconds. Meanwhile 24.97 g of the fatty alkyl ether sulfate-based foam, having a density of 75 g/L, was added to the slurry to adjust a gypsum slurry with a wet density of 1000+/−10 kg/$m^3$. The flow was 13.2 cm.

Comparative Example 4

A mixture of 350 g stucco (R-hemihydrate from natural source) and 1.35 g accelerator (fine milled dehydrate from ball mill to adjust a setting time of about 2:20 min) was interspersed in liquid. Liquid consists of 0.035 g of Plast-retard (from Sicit 2000), 0.49 g of Melflux PCE 1493 L (from BASF) and 192.03 g of water. Then the powder had to soak in liquid for 15 seconds. Afterwards the slurry was mixed with the Hobart mixer at level II (285 rpm) for 30 seconds. Meanwhile 24.97 g of the fatty alkyl ether sulfate-based foam, having a density of 75 g/L, was added to the slurry to adjust a gypsum slurry with a wet density of 1000+/−10 kg/$m^3$. The flow was not measurable due to pasty consistency.

Inventive Example 5

A mixture of 350 g stucco (R-hemihydrate from natural source) and 1.35 g accelerator (fine milled dehydrate from ball mill to adjust a setting time of about 2:20 min) was interspersed in liquid. Liquid consists of 0.035 g of Plast-retard (from Sicit 2000), 0.49 g of Melflux PCE 1493 L (from BASF), 0.179 g Polymer of Example 2 and 196.57 g of water. Then the powder had to soak in liquid for 15 seconds. Afterwards the slurry was mixed with the Hobart mixer at level II (285 rpm) for 30 seconds. Meanwhile 20.43 g of the fatty alkyl ether sulfate-based foam, having a density of 75 g/L, was added to the slurry to adjust a gypsum slurry with a wet density of 1000 +/−10 kg/$m^3$. The flow was 18.2 cm.

Inventive Example 6

A mixture of 350 g stucco (R-hemihydrate from natural source) and 1.35 g accelerator (fine milled dehydrate from ball mill to adjust a setting time of about 2:20 min) was interspersed in liquid. Liquid consists of 0.035 g of Plast-retard (from Sicit 2000), 0.49 g of Melflux PCE 1493 L (from BASF), 0.161 g Polymer of Example 3 and 196.57 g of water. Then the powder had to soak in liquid for 15 seconds. Afterwards the slurry was mixed with the Hobart mixer at level II (285 rpm) for 30 seconds. Meanwhile 20.43 g of the fatty alkyl ether sulfate-based foam, having a density of 75 g/L, was added to the slurry to adjust a gypsum slurry with a wet density of 1000 +/−10 kg/$m^3$. The flow was 18.6 cm.

Inventive Example 7

A mixture of 350 g stucco (R-hemihydrate from natural source) and 1.35 g accelerator (fine milled dehydrate from ball mill to adjust a setting time of about 2:20 min) was interspersed in liquid. Liquid consists of 0.035 g of Plast-retard (from Sicit 2000), 0.49 g of Melflux PCE 1493 L (from BASF), 0.179 g Polymer of Example 4 and 196.57 g of water. Then the powder had to soak in liquid for 15 seconds. Afterwards the slurry was mixed with the Hobart mixer at level II (285 rpm) for 30 seconds. Meanwhile 20.43 g of the fatty alkyl ether sulfate-based foam, having a density of 75 g/L, was added to the slurry to adjust a gypsum slurry with a wet density of 1000 +/−10 $kg/m^3$. The flow was 18.1 cm.

The results of the gypsum tests are summarized in the following table (Dos. denotes Dosage):

| Clay Blocker | | Binder | Melflux PCE 1493 L | Water/ | Accelerator | Retarder | Foam | | |
|---|---|---|---|---|---|---|---|---|---|
| Name | Dos./ g | Dos./ g | Dos./ g | binder ratio | Dos./ g | Dos./ g | Dos./ s | Flow cm | stiffening s |
| Comparative Example 3 (PolyDAD MAC) | 0.210 | 350 | 0.49 | 0.62 | 1.35 | 0.035 | 11 | 13.2 | 130 |
| Comparative Example 4 (no Clay Blocker) | — | 350 | 0.49 | 0.62 | 1.35 | 0.035 | 11 | not measurable | |
| Inventive Example 5 (Example 2) | 0.170 | 350 | 0.49 | 0.62 | 1.35 | 0.035 | 9 | 18.2 | 130 |
| Inventive Example 6 (Example 3) | 0.161 | 350 | 0.49 | 0.62 | 1.35 | 0.035 | 9 | 18.6 | 130 |
| Inventive Example 7 (Example 4) | 0.179 | 350 | 0.49 | 0.62 | 1.35 | 0.035 | 9 | 18.1 | 130 |

All the inventive examples show significantly improved dosage efficiency compared to state of the art (PolyDADMAC). In addition, there is a positive influence on the foam, visible in a reduced foam dosage time to achieve target wet density of gypsum slurry.

The invention claimed is:

1. A construction material composition comprising

A) at least one non-ionic copolymer, wherein the copolymer is uncharged at a pH range of 5 to 9, comprising residues based on the following monomer components:

i) monomer Component A, comprising an ethylenically unsaturated monomer comprising at least one alkyl amide moiety or at least one nitrogen-containing heterocyclic moiety, and ii) monomer Component B, comprising an ethylenically unsaturated monomer comprising at least one polyether moiety, wherein the at least one polyether moiety in monomer Component B comprises the structural unit (a)

$$*\text{—U—(C(O))}_k\text{—X-(AlkO)}_n\text{—W} \quad \text{(a)}$$

wherein

* denotes the binding site to the polymer,

U is a chemical bond or a $C_1$-$C_8$-alkylene,

X is O, N, or $NR^1$, k is 0 or 1, n is an integer having a mean value of between 24 to 300, based on the whole non-ionic copolymer, Alk is $C_2$-$C_4$-alkylene, wherein Alk may be same or different within the group of $(AlkO)_n$, W is H, $C_1$-$C_6$-alkyl, aryl, or Y—F, Y is a linear or branched $C_2$-$C_8$-alkylene, which may further be substituted with a phenyl, F is a 5 to 10-membered nitrogen heterocycle, which is attached via a nitrogen to Y, wherein besides the nitrogen atom and carbon atoms 1, 2, or 3 additional heteroatoms selected from the group consisting of oxygen, nitrogen, and sulfur may be present as ring members and wherein the nitrogen ring members may be bond to a moiety $R^2$, and wherein 1 or 2 carbon ring members may be present as carbonyl, $R^1$ is H, $C_1$-$C_4$-alkyl, or benzyl, and $R^2$ is H, $C_1$-$C_4$-alkyl, or benzyl; and B) at least one inorganic binder based on calcium sulfate.

2. A construction material composition comprising

A) at least one non-ionic copolymer, wherein the copolymer is uncharged at a pH range of 5 to 9, comprising residues based on the following monomer components:

i) monomer Component A, comprising an ethylenically unsaturated monomer comprising at least one alkyl amide moiety or at least one nitrogen-containing heterocyclic moiety, and ii) monomer Component B, comprising an ethylenically unsaturated monomer comprising at least one polyether moiety, wherein the at least one polyether moiety in monomer Component B comprises the structural unit (a)

$$*\text{—U—(C(O))}_k\text{—X-(AlkO)}_n\text{—W} \quad \text{(a)}$$

wherein

* denotes the binding site to the polymer,

U is a chemical bond or a $C_2$-$C_8$-alkylene,

X is O, N, or $NR^1$, k is 0 or 1, n is an integer having a mean value of between 24 to 300, based on the whole non-ionic copolymer, Alk is $C_2$-$C_4$-alkylene, wherein Alk may be same or different within the group of $(AlkO)_n$, W is H, $C_1$-$C_6$-alkyl, aryl, or Y—F, Y is a linear or branched $C_2$-$C_8$-alkylene, which may further be substituted with a phenyl, F is a 5 to 10-membered nitrogen heterocycle, which is attached via a nitrogen to Y, wherein besides the nitrogen atom and carbon atoms 1, 2, or 3 additional heteroatoms selected from the group consisting of oxygen, nitrogen, and sulfur may be present as ring members and wherein the nitrogen ring members may be bond to a moiety $R^2$, and wherein 1 or 2 carbon ring members may be present as carbonyl, $R^1$ is H, $C_1$-$C_4$-alkyl, or benzyl, and $R^2$ is H, $C_1$-$C_4$-alkyl, or benzyl, with the proviso that k is 0 if U is a chemical bond; and B) at least one inorganic binder selected from a hydraulic binder or a latent hydraulic binder.

3. The construction material composition according to claim 1, wherein the monomer Component A is selected from the group consisting of N,N-dimethylacrylamide, N,N-dimethylmetacrylamide, N,N-diethylacrylamide, N,N-diethylmethacrylamide, 1-vinyl-2-pyrrolidinone, N-vinylcaprolactam, 4-acryloylmorpholine, N-methyl-N-vinylacetamide, 1-vinylimidazole, 4-vinylpyridine, and 1-vinyl-1,2,4-triazole.

4. The construction material composition according to claim 1, wherein the non-ionic copolymer further comprises residues based on a monomer Component C having the formula (1)

(1)

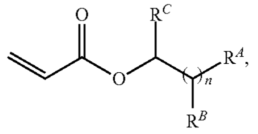

wherein $R^A$ is H, OH, ($C_1$-$C_3$-alkylene)-OH, or $C_1$-$C_3$-alky;

$R^B$ is H, OH, ($C_1$-$C_3$-alkylene)-OH, or $C_1$-$C_3$-alky;

$R^C$ is H, OH, ($C_1$-$C_3$-alkylene)-OH, or $C_1$-$C_3$-alky; and n is an integer from 0 to 10.

5. The construction material composition according to claim 1, further comprising C) a plasticizer, wherein the plasticizer is a water-soluble comb polymer which is present as a copolymer which contains, on the main chain, side chains having ether functions and acid functions or a composition containing polycondensates, wherein the polycondensates contains (I) at least one structural unit consisting of an aromatic or heteroaromatic moiety bearing a polyether side chain, and (II) at least one structural unit consisting of an aromatic or heteroaromatic moiety bearing at least one phosphoric acid ester group and/or its salt.

6. The construction material composition according to claim 1, wherein the construction material comprises at least one additional inorganic binder selected from the group consisting of hydraulic binder, latent hydraulic binder, inorganic binder based on calcium sulfate, and mixtures thereof.

7. The construction material composition according to claim 1, wherein a hydraulic binder is comprised, which is selected from the group consisting of Portland cement, calcium aluminate cement, sulfoaluminate cement, and mixtures thereof and/or wherein a latent hydraulic binder is comprised, which is blast furnace slag.

8. A method comprising providing a non-ionic copolymer, wherein the copolymer is uncharged at a pH range of 5 to 9, comprising residues based on the following monomer components:

i) monomer Component A, comprising an ethylenically unsaturated monomer comprising at least one alkyl amide moiety or at least one nitrogen-containing heterocyclic moiety;

ii) monomer Component B, comprising an ethylenically unsaturated monomer comprising at least one polyether moiety comprising the structural unit (a)

*—U—(C(O))k-X-(AlkO)n-W (a)

wherein

* denotes the binding site to the polymer,

U is a chemical bond or a C1-C8-alkylene,

X is O, N, or NR1, k is o or 1, n is an integer having a mean value of between 3 to 300, based on the whole non-ionic copolymer, Alk is C2-C4-alkylene, wherein Alk may be same or different within the group of (AlkO) n, W is H, C1-C6-alkyl, aryl, or Y—F, Y is a linear or branched C2-C8-alkylene, which may further be substituted with a phenyl, F is a 5 to 10-membered nitrogen heterocycle, which is attached via a nitrogen to Y, wherein besides the nitrogen atom and carbon atoms 1, 2, or 3 additional heteroatoms selected from the group consisting of oxygen, nitrogen, and sulfur may be present as ring members and wherein the nitrogen ring members may be bond to a moiety R2, and wherein 1 or 2 carbon ring members may be present as carbonyl, R1 is H, C1-C4-alkyl, or benzyl, and R2 is H, C1-C4-alkyl, or benzyl; and at least one inorganic binder selected from a hydraulic binder or a latent hydraulic binder or at least one inorganic binder based on calcium sulfate, and iii) optionally monomer Component C, having the formula (1) wherein RA is H, OH, (C1-C3-alkylene)-OH, or C1-C3-alky;

RB is H, OH, (C1-C3-alkylene)-OH, or C1-C3-alky;

RC is H, OH, (C1-C3-alkylene)-OH, or C1-C3-alky; and n is an integer from o to 10, preparing a construction material composition, and modifying robustness against clay deviations, without retarding the set time of the construction material composition.

9. A in dry mortar mixture, a concrete construction application, plate materials, self-leveling under or overlayments, screeds, repair mortars, grouts, plasters, or tile adhesives comprising the construction material composition according to claim 1.

* * * * *